(12) United States Patent
Wang et al.

(10) Patent No.: US 10,673,094 B2
(45) Date of Patent: Jun. 2, 2020

(54) RECHARGEABLE NON-AQUEOUS MG—BR$_2$ BATTERY

(71) Applicants: Dunwei Wang, Chestnut Hill, MA (US); Xiahui Yao, Chestnut Hill, MA (US); Jingru Luo, Chestnut Hill, MA (US); Qi Dong, Boston, MA (US)

(72) Inventors: Dunwei Wang, Chestnut Hill, MA (US); Xiahui Yao, Chestnut Hill, MA (US); Jingru Luo, Chestnut Hill, MA (US); Qi Dong, Boston, MA (US)

(73) Assignee: Trustees of Boston College, Chestnut Hill, MA (US)

(*) Notice: Subject to any disclaimer, the term of this patent is extended or adjusted under 35 U.S.C. 154(b) by 155 days.

(21) Appl. No.: 15/938,232

(22) Filed: Mar. 28, 2018

(65) Prior Publication Data

US 2018/0323466 A1    Nov. 8, 2018

Related U.S. Application Data

(60) Provisional application No. 62/502,811, filed on May 8, 2017.

(51) Int. Cl.
*H01M 10/054* (2010.01)
*H01M 4/134* (2010.01)
(Continued)

(52) U.S. Cl.
CPC ....... *H01M 10/054* (2013.01); *H01M 2/1646* (2013.01); *H01M 4/13* (2013.01); *H01M 4/134* (2013.01); *H01M 4/368* (2013.01); *H01M 4/466* (2013.01); *H01M 4/663* (2013.01); *H01M 10/0568* (2013.01); *H01M 10/0569* (2013.01); *H01M 2300/0028* (2013.01); *H01M 2300/0037* (2013.01)

(58) Field of Classification Search
None
See application file for complete search history.

(56) References Cited

U.S. PATENT DOCUMENTS

2016/0208030 A1* 7/2016 Gavvalapalli ......... C08F 112/14
2017/0062863 A1* 3/2017 Huang .................. H01M 8/188

OTHER PUBLICATIONS

Ha et al., "Magnesium(II) Bis(trifluoromethane sulfonyl) Imide-Based Electrolytes with Wide Electrochemical Windows for Rechargeable Magnesium Batteries", Applied Materials & Interfaces, pp. 4063-4073, Feb. 21, 2014 (Year: 2014).*

* cited by examiner

*Primary Examiner* — Carmen V Lyles-Irving
(74) *Attorney, Agent, or Firm* — US-China Intellectual Property Counsel, LLC

(57) ABSTRACT

The present invention demonstrates Br$_2$-based conversion chemistry is a potential route toward rechargeable Mg-batteries. Compared with Mg-ion or Mg-air chemistries, the Mg—Br$_2$ system features fast kinetics and good cyclability. In one embodiment, the present invention provides a rechargeable non-aqueous, dual-electrolyte scheme. In one embodiment, the anolyte consisted of Mg(TFSI)$_2$ dissolved in a monoglyme and diglyme mixture, whereas the catholyte was composed of Mg(TFSI)$_2$ in PYR$_{14}$TFSI ionic liquid mixed with active bromine species. When Mg was used as the anode, an open circuit voltage of 3.0 V (vs. Mg$^{2+}$/Mg) was measured.

9 Claims, 22 Drawing Sheets

(51) Int. Cl.
*H01M 4/46* (2006.01)
*H01M 4/66* (2006.01)
*H01M 10/0568* (2010.01)
*H01M 10/0569* (2010.01)
*H01M 4/36* (2006.01)
*H01M 2/16* (2006.01)
*H01M 4/13* (2010.01)

RECHARGEABLE NON-AQUEOUS MG—BR$_2$ BATTERY

FIELD OF THE INVENTION

The present invention is related generally to the field of rechargeable battery. In one embodiment, the present invention provides a rechargeable non-aqueous Mg—Br$_2$ battery.

BACKGROUND OF THE INVENTION

As the fifth most abundant element on the crust of Earth, Mg features advantages over Li such as low cost, high volumetric capacity (3833 mAh/cm$^3$ for Mg vs. 2046 mAh/cm$^3$ for Li) and no dendritic growth upon plating, making it a desired material for electrochemical energy storage applications. Indeed, significant research attention has been attracted to study Mg chemistries for the development of Mg batteries as a potential alternative to Li batteries. For instance, researchers have examined cathode materials that would enable facile Mg$^{2+}$ intercalation for high cyclability. The divalent nature of Mg$^{2+}$ nevertheless presents a critical challenge for such efforts, and only limited success has been reported. Parallel efforts have also been focused on conversion chemistries between Mg and O$_2$. The low discharge potential and difficulty to recharge due to the spontaneous formation of MgO represent major roadblocks that must be overcome for future development toward that direction. Alternatively, the conversion between Mg and S is yet another possibility that has been explored. The low voltages (typically 0.9-1.5 V), however, significantly compromise the promises held by Mg—S batteries. Up to date, the advantages held by Mg as an energy storage material remains untapped. In response to these challenges, the present invention provides rechargeable Mg-batteries with conversion chemistry between Mg and Br$_2$ species (FIG. 1).

Halogens have been previously explored for energy storage applications in Al—Cl$_2$, Zn—Br$_2$, Li—I$_2$ and Li—Br$_2$ systems. Compared with other halogens, Br$_2$ offers the unique balance between energy density and chemical stability (335 mAh/gBr$_2$; Br$_2$/Br-=+1.07 vs SHE) and has received the most research attention. As the reactivity of Br$_2$ would prohibit long-term utilization of aprotic electrolyte such as DMSO (dimethyl sulfoxide), THF (tetrahydrofuran) or organic carbonates, previous studies on Br$_2$ batteries were mostly carried out in aqueous solutions. The necessity for H$_2$O as a catholyte limits the anode choices greatly. For instance, an aqueous catholyte would prevent the utilization of Li metal as an anode unless a ceramic Li ion conductor is present, which unfortunately introduces issues such as cost, high resistivity and safety concerns due to possible leakages of the electrolyte to react with Li. Moreover, the hybrid design adopted in the Li—Br$_2$ studies that utilize ceramic solid electrode to compartmentalize the cell components is not applicable for the Mg battery due to the lack of room-temperature Mg$^{2+}$ conductive solid electrolytes. The present invention proposes a new strategy to address the challenges associated with Mg batteries.

SUMMARY OF THE INVENTION

In one embodiment, the strategy of the present invention employs separate electrolytes for the anode and cathode (see FIG. 1). To solve issues connected to the reactivity of Br$_2$, a catholyte is introduced based on ionic liquid and Br$^-$ as a stabilizing agent. To enable reversible striping and plating of Mg, a mixed non-aqueous anolyte was use. Together, this strategy permits the measurement of high cell voltage (3.0 V) and good cyclability (>20 cycles) using Mg metal as the anode and MgBr$_2$ as the starting materials (with carbon paper as the cathode current collector).

The current invention demonstrates features and advantages that will become apparent to one of ordinary skill in the art upon reading the attached Detailed Description of the Invention.

In one embodiment of the present invention, there is provided an electrochemical cell comprising (i) an anode comprising Mg, (ii) a cathode comprising a carbonaceous material as current collector, (iii) an anolyte in contact with the anode, said anolyte comprises a non-aqueous composition that allows for Mg platting and stripping, and (iv) a catholyte in contact with the cathode, said catholyte comprises active bromine species and a non-aqueous composition that allows for conversion between Br$_3^-$ and Br$^-$, wherein the anolyte and catholyte are contained in two separate chambers, said chambers are connected via a porous barrier.

In one embodiment of the present invention, the anolyte of the present invention comprises Mg(TFSI(bis(trifluoromethanesulfonyl)imide))$_2$ dissolved in a monoglyme and diglyme mixture.

In one embodiment of the present invention, the catholyte of the present invention comprises Mg(TFSI)$_2$ in PYR$_{14}$TFSI (1-butyl-1-methylpyrrolidinium bis(trifluoromethanesulfonyl)imide).

In one embodiment of the present invention, there is provided a rechargeable magnesium battery comprising one or more of the electrochemical cell of the present invention.

In one embodiment of the present invention, there is provided an electrochemical cell comprising an anode comprising Mg, a cathode comprising a carbonaceous material as current collector, and a non-aqueous composition in contact with said anode and cathode, said composition comprises active bromine species (Br$_2$) and allows for (i) Mg platting and stripping, and (ii) conversion between Br$_3^-$ and Br$^-$. In one embodiment, there is also provided a rechargeable magnesium battery comprising one or more of the above electrochemical cell of the present invention.

BRIEF DESCRIPTION OF THE DRAWINGS

FIG. 2A shows the voltage profile during discharge (orange trace) and charge (blue trace) with limited Br$_3^-$ or MgBr$_2$ respectively. Capacity normalized to the active MgBr$_2$. Current density: 0.4 mA/cm$^2$. The cutoff voltage is 3.7 V for the charging and 1.5 V for discharging process. FIG. 2B shows coulombic efficiency, average discharge/charge voltage measured over 20 cycles with 0.05 M MgBr$_2$ in the starting catholyte. Absolute current: 0.2 mA, charging time: 2 h, 7.5% utilization of total Br$^-$.

FIG. 3A shows rate performance of the cathode in catholyte with 4 M Br$_2$ stabilized by Br$^-$. The current density was ramped from 0.04 mA/cm$^2$ to 2 mA/cm$^2$ stepwise for 0.5 h for each discharge/charge segment. FIG. 3B shows cycling performance with voltage-time profile in catholyte with 2 M $Br_2$ stabilized by Br- under 0.1 mA/cm$^2$ and 1 h for discharging or charging. VWE (blue trace) reports on the working electrode voltage (carbon paper), and VCE (black trace) reports on the counter electrode voltage (Mg foil).

FIG. 4A shows faradic efficiency of $Br_2$ generation during recharge. Black squares: amount of $Br_2$ or $Br_3^-$ as calculated from charges passed; orange circles: measured $Br_2$ or $Br_3^-$ amount. FIG. 4B shows Raman spectra qualitatively confirmed the reduction from $Br_2$ to $Br_3^-$ to $MgBr_2$ could be complete, measurement performed at 0, 50%, 100% depth of discharge, respectively.

FIG. 5A shows pristine Mg anode; FIG. 5B shows plated Mg anode after initial charge; FIG. 5C shows stripped Mg anode after discharge; FIG. 5D shows Mg anode after prolonged cycles; FIG. 5E shows pristine carbon paper electrode; FIG. 5F shows carbon paper electrode after cycling test in FIG. 8. Scale bars: 10 μm.

FIG. 6A shows Mg anode chemistry with the scan rate of 20 mV/s. Testing electrolyte: 0.1 M $Mg(TFSI)_2$ in DME/diglyme (1:1 volume) solution. The reference electrode and the working electrode were both Mg metal strips. FIG. 6B shows $MgBr_2$ on Pt electrode with the scan rate of 100 mV/s. Testing electrolyte: 10 mM $MgBr_2$ and 0.1 M $Mg(TFSI)_2$ in $PYR_{14}TFSI$ solution. The counter and the reference electrode were Mg metal strips, whereas the working electrode was a Pt wire.

FIG. 7A shows electrochemical oxidation of Br- to 0.8 mAh $Br_3^-$ and consecutive discharge curve displayed in FIG. 2A. Current density: 0.4 mA/cm$^2$. Charging time: 4 h. Discharge cutoff voltage: 1.5V. Utilization ratio of Br- in the solution during charging: 15%. FIG. 7B shows voltage-capacity profile of FIG. 2B. One in every 5 cycles was plotted for clarity. Utilization ratio of Br- in the solution during charging: 7.5%.

FIG. 12A shows SEM images of a reference Mg after cycling; and FIG. 12B shows an anode Mg after the cycling operation from FIG. 8A-B.

To be noted that the test here is just to normalize the crossover rate of the bromine species, so relative high concentration, symmetric solution choice and vigorous stirring of the receiving chamber were performed. The real test cell experienced fewer crossovers than the test here due to the lower concentration, asymmetric electrolyte usages and the absence of stirring in the anolyte side.

Figure 14:
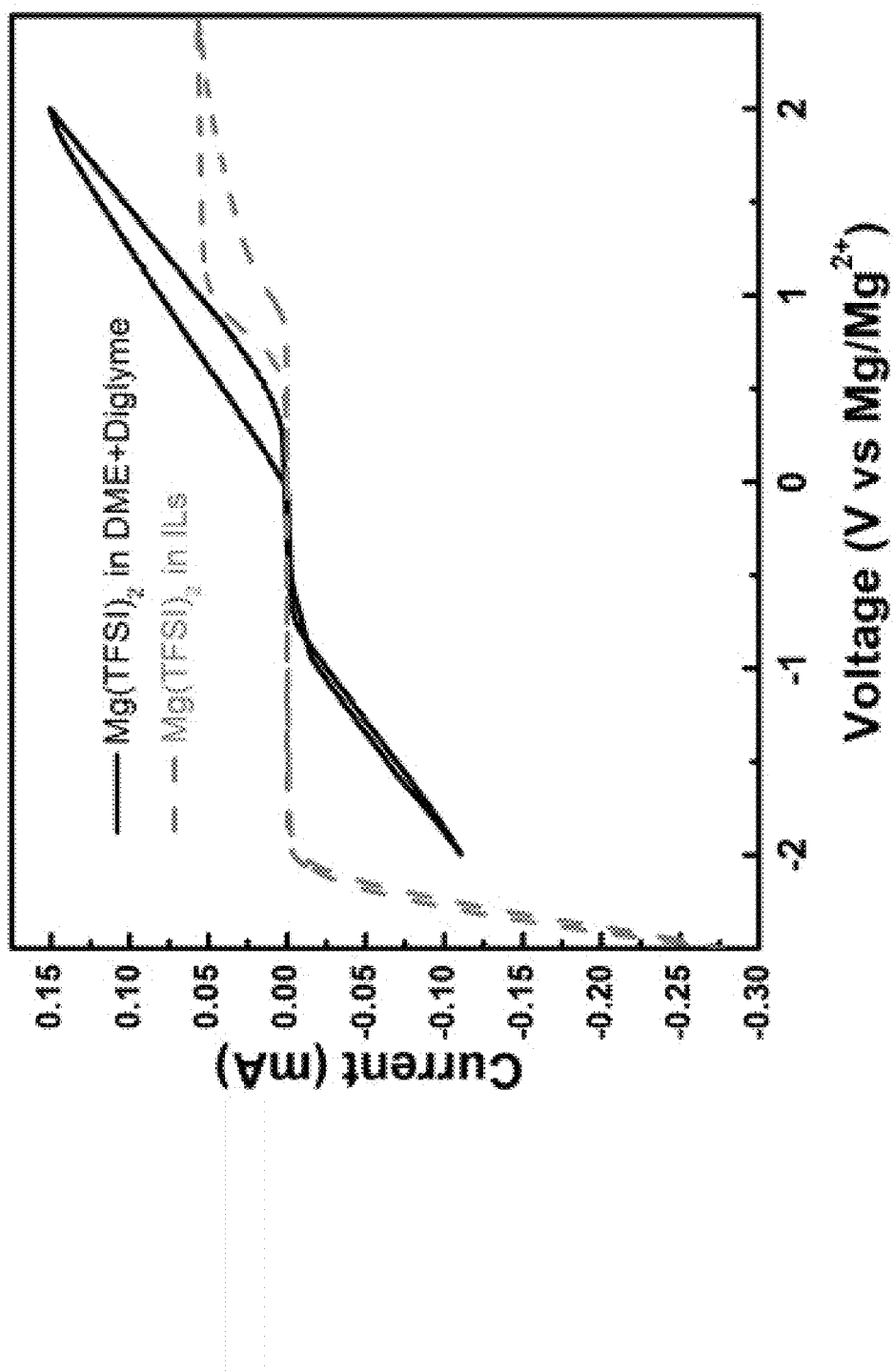

FIG. 14 shows anode chemistry in ether based and ionic liquid-based electrolytes. Comparison of Mg anode chemistry in ether-based electrolyte (black trace) and ionic liquid (blue trace). The working electrode, the reference electrode and the counter electrode were all Mg strips. Scan rate: 20 mV.

Figure 15:
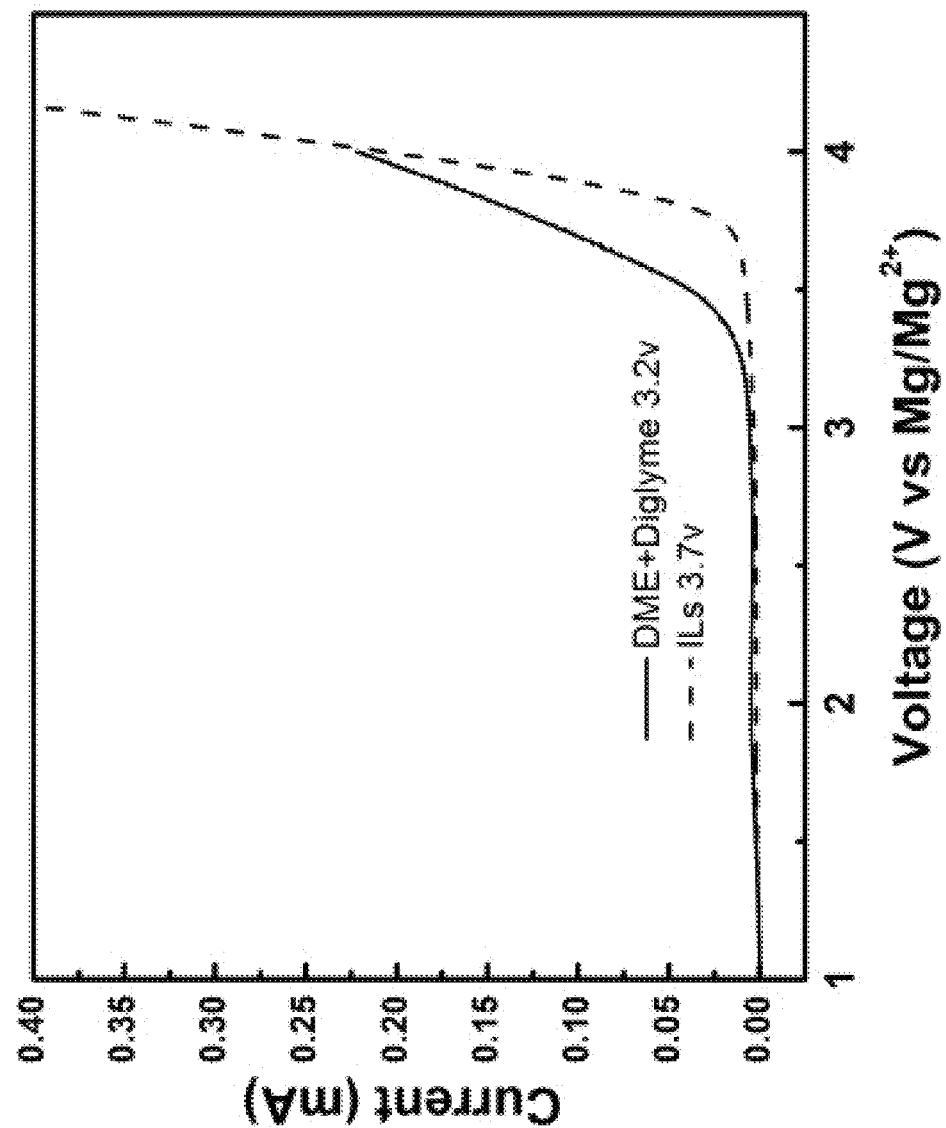

FIG. 15 shows anodic stability of the electrolytes. The stability of the electrolytes characterized by linear scan voltammogram for 0.1 M $Mg(TFSI)_2$ in ionic liquid (red trace) and in DME and diglyme solution (blue trace). Pt wire served as the working electrode and two Mg strips served as the counter and reference electrode, respectively. Stability of pure $PYR_{14}TFSI$ catholyte (>3.7 V) would be suitable for the $Br_2$ chemistry. The ether-based mixed electrolyte starts to decompose at or above 3.2 V.

Figure 16:
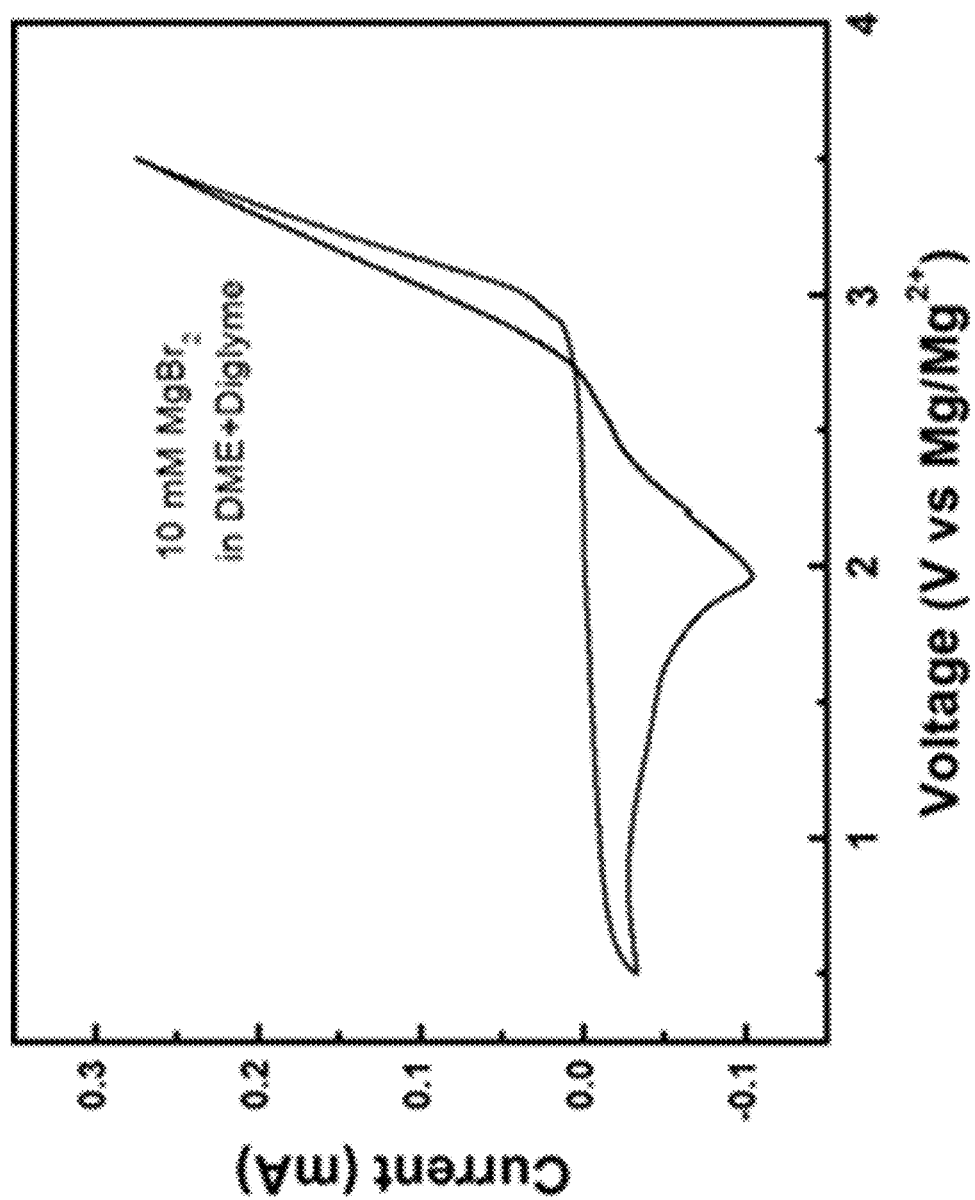

FIG. 16 shows CV of $MgBr_2$ in DME+ diglyme as catholyte. CV scan of 10 mM $MgBr_2$ in DME and diglyme electrolyte. Decomposition of the ether electrolyte mixed with the bromide oxidation exhibited no observable oxidation peak. Pt wire served as the working electrode and two Mg strips served as the counter and reference electrode, respectively.

In addition, the color of liquid bromine stored in DME+ diglyme faded overtime, indicating there are reactions between $Br_2$ and ether base electrolyte, possibly through a radical-mediated mechanism. This phenomenon, however, is not observed in the ionic liquid-based catholyte.

Figure 17:
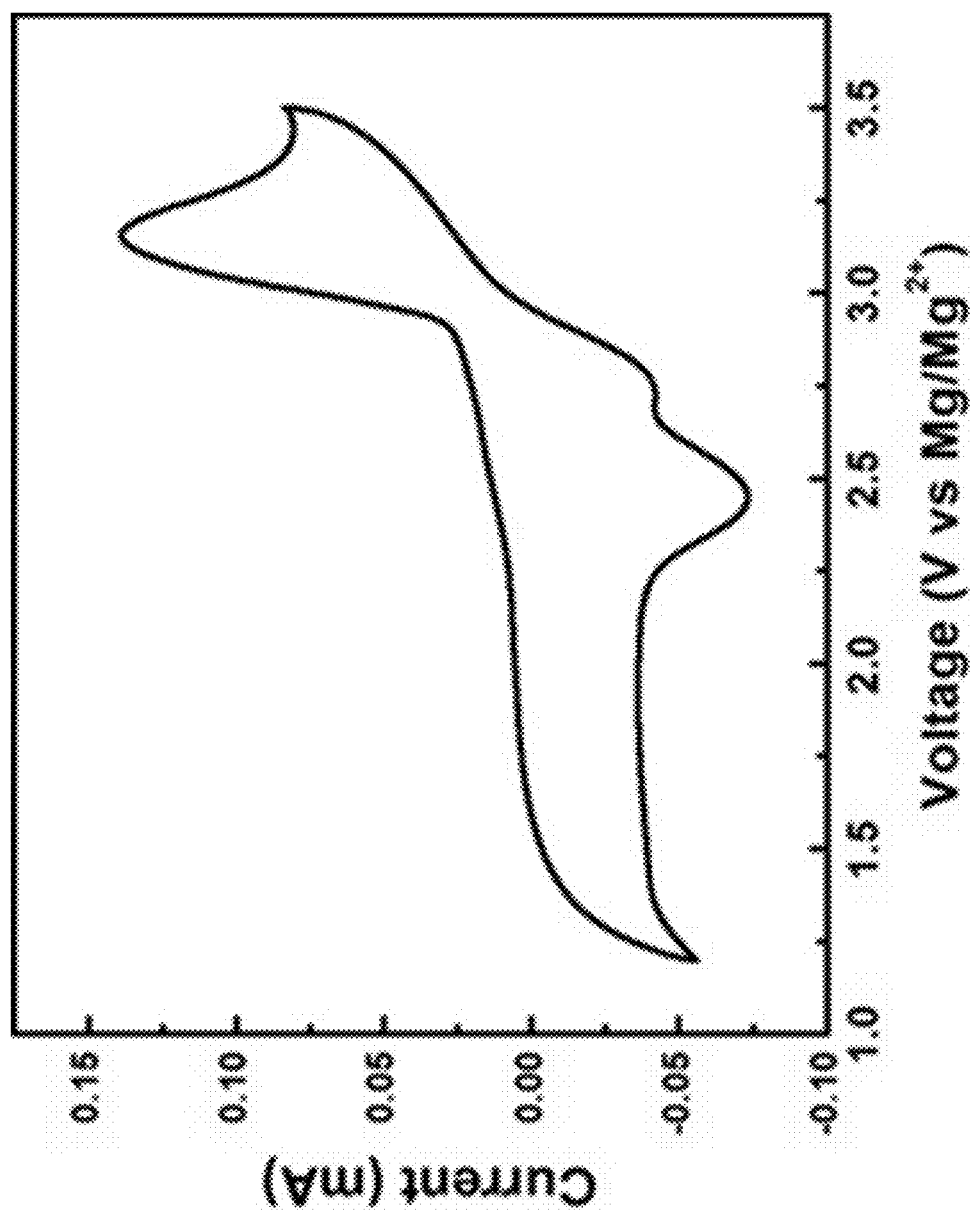

FIG. 17 shows full-range CV scans of the ionic liquid catholyte with $MgBr_2$ on carbon paper. CV scan for the full electrochemical profile on the carbon current collector with $MgBr_2$ in $PYR_{14}TFSI$ catholyte. Carbon paper was used as the working electrode and Mg strips served as the reference and counter electrodes, respectively. Scan rate: 20 mV/s. The only distinct oxidation peak represents Br-→$Br_3^-$. The two reduction peaks at 2.8 V and 2.5 correspond to $Br_2$→$Br_3^-$ and $Br_3^-$→Br-, respectively. The oxidation current above 3.5 V and the reduction current below 1.3 V may be ascribed to the ionic liquid decompositions.

Figure 18:
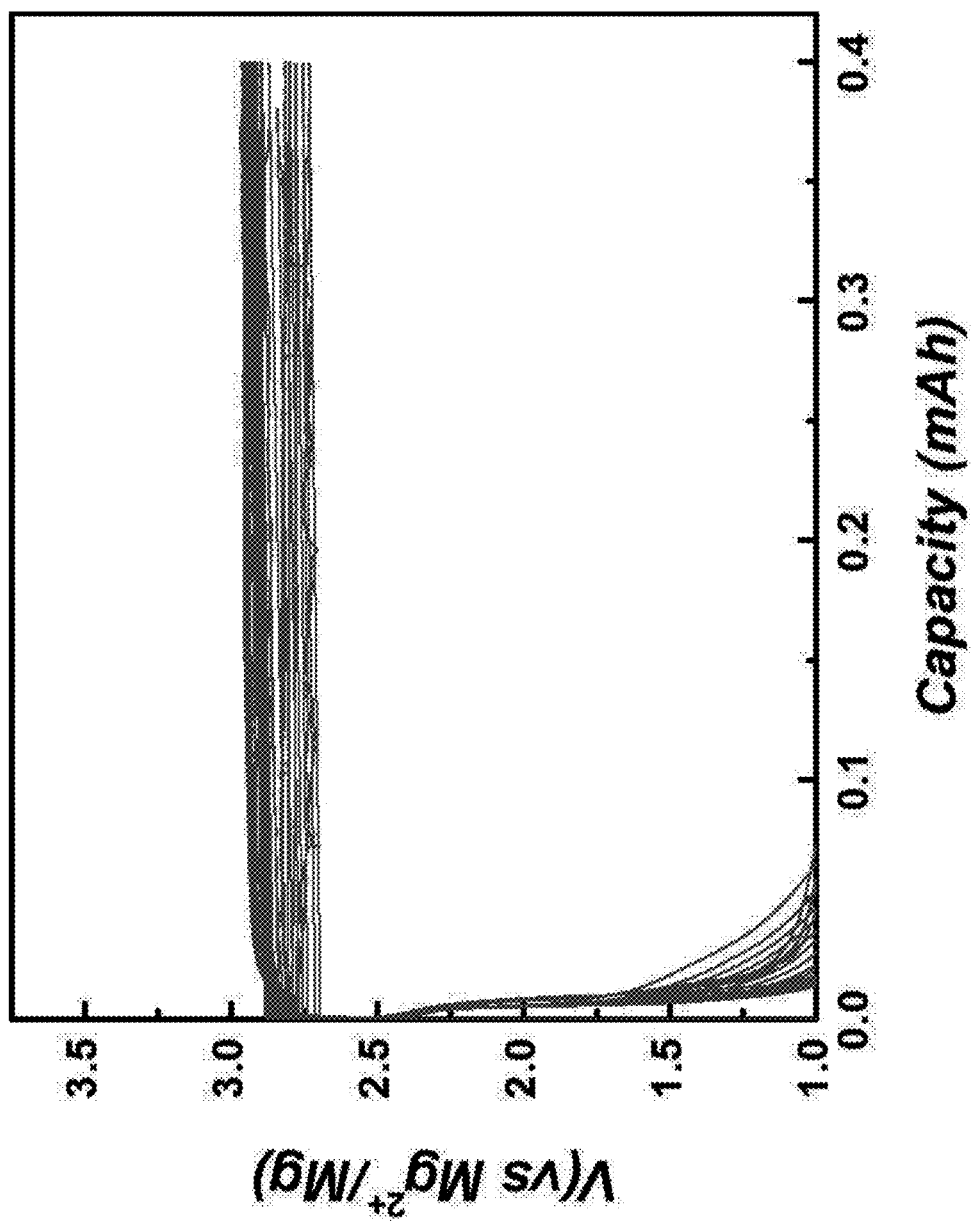

FIG. 18 shows the necessity of glass frit to prevent crossover. The undesired voltage profile of the cell without the porous glass frit shows the necessity to separate the anolyte and catholyte. The testing configuration is the same with the ones in the main text: the anode and reference electrode are both Mg strips and the cathode is the carbon paper, the electrolyte are the 1:1 mixed anolyte and catholyte with 0.05 M $MgBr_2$ as active species. The absolute current was also 0.2 mA under continuous stirring of the electrolyte.

Comparing with FIG. 7A-B, the low dischargeable capacity might originate from the direct consumption of bromine species on the Mg anode after the generation on the carbon cathode or the reaction between the anolyte compositions with the bromine species. The recharge voltage relative to reference electrode has also been shifted downward, presumably as a result of reference shift due to the completion of $Mg_2^+/Mg$ and the $Br_3^-/Br^-$ redox pairs in the solution.

Figure 19:
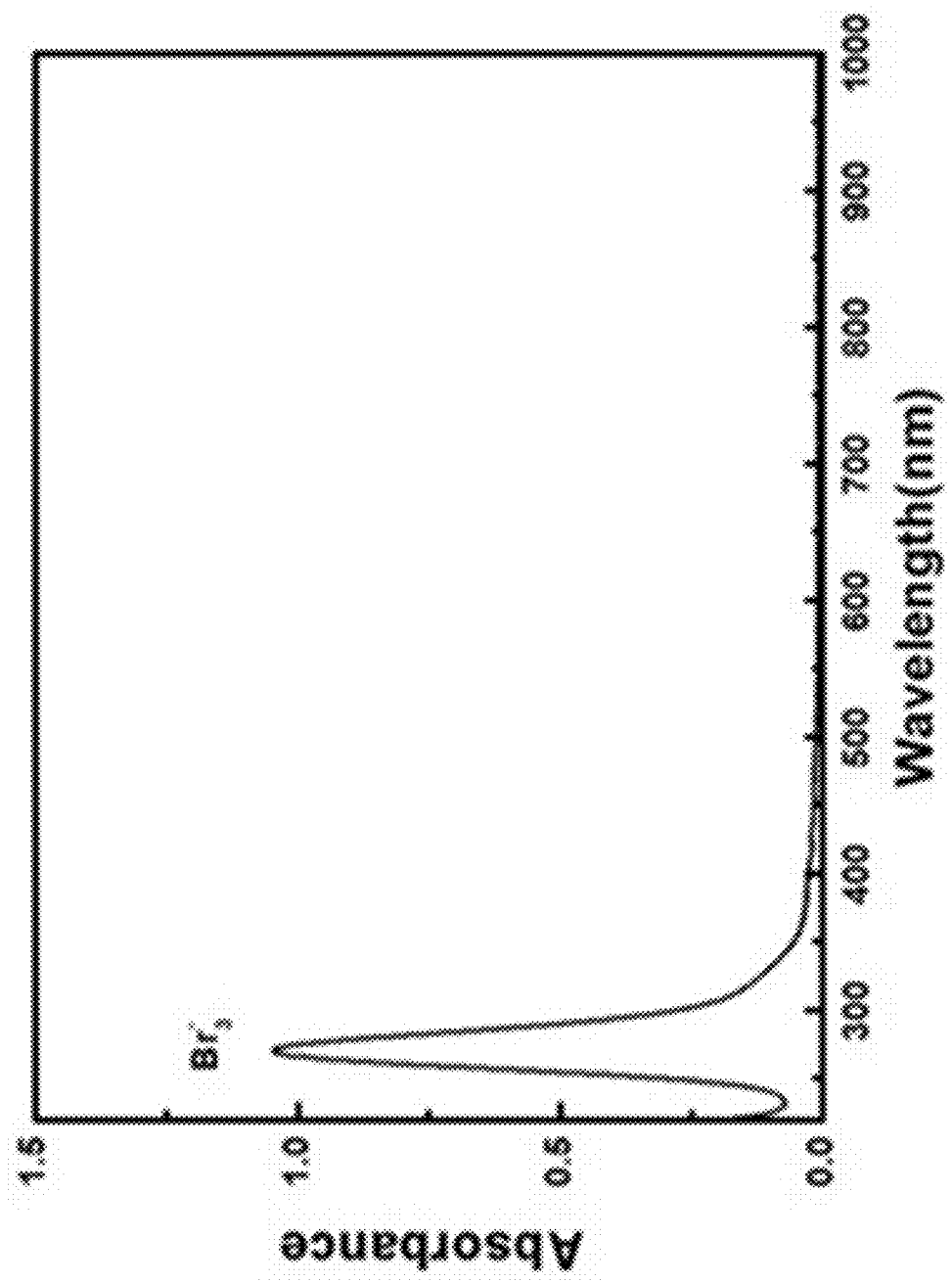

FIG. 19 shows UV-Vis spectrum of the detection of $Br_3^-$ in $PYR_{14}TFSI$ ionic liquid. UV-Vis spectrum of the detection of $Br_3^-$ in $PYR_{14}TFSI$ ionic liquid. The extraordinarily high absorption coefficient of the $Br_3^-$ at 270 nm requires high ratio of dilution before to reduce the absorbance to a reasonable value. For this specific test, the sample was diluted 8000 times by pure ionic liquid to obtain the spectrum.

Figure 3:
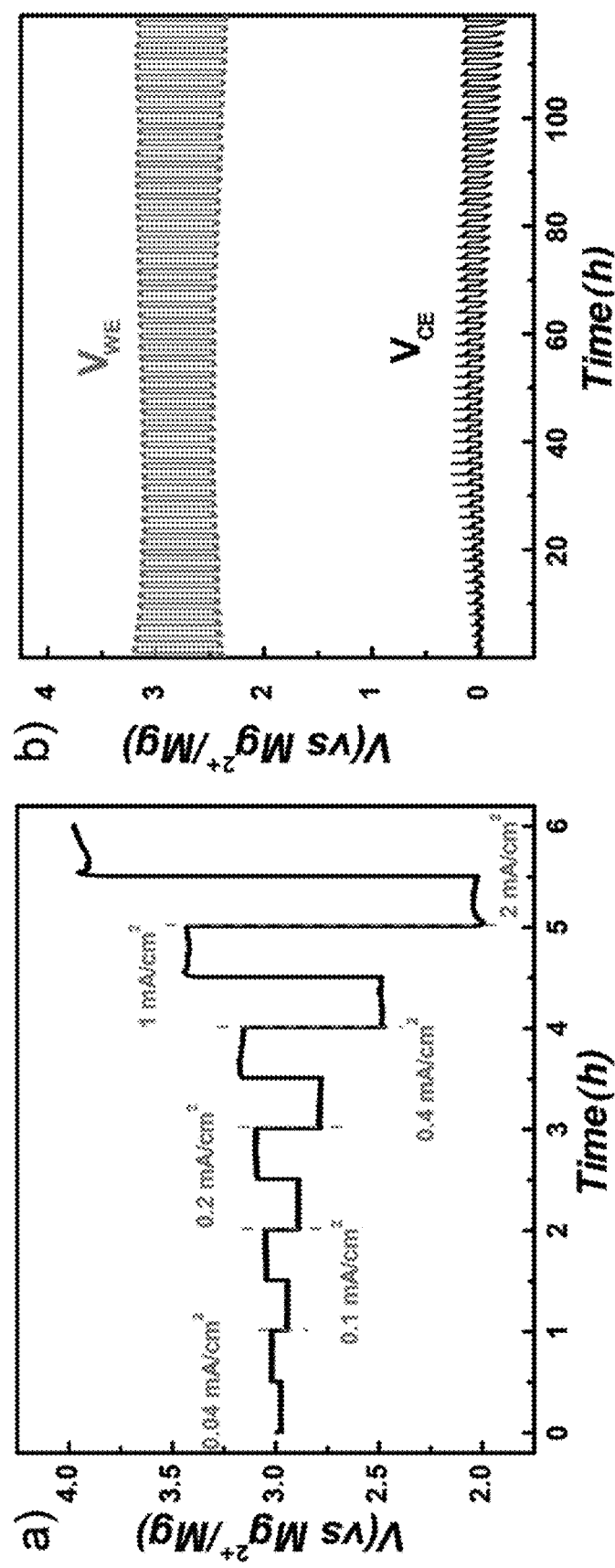
FIGS. 3A-B show rate performance and cyclability.
Figure 20:
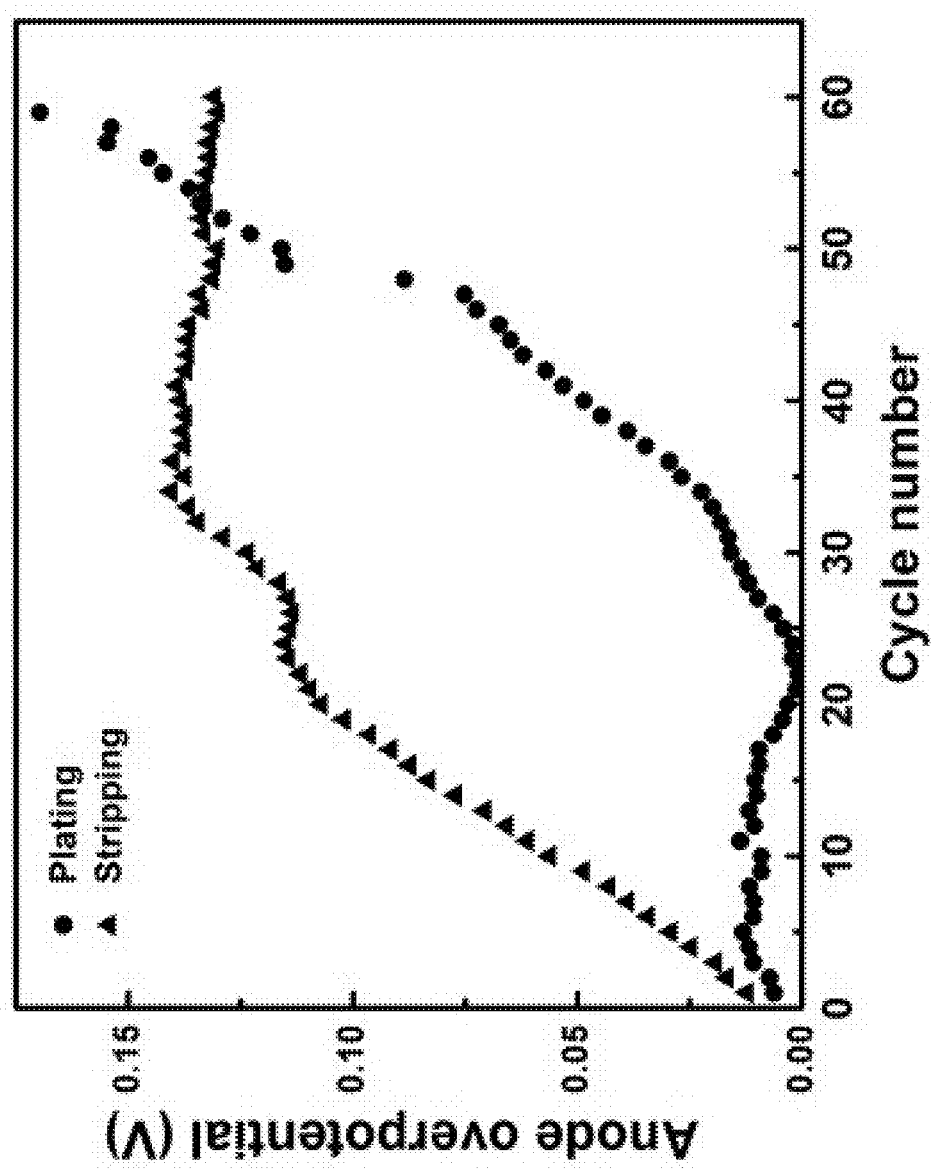

FIG. 20 shows the average anode overpotential during cycling in FIG. 3B. Average anode overpotential during cycling in FIG. 3B. The Mg reference electrode was assumed as the equilibrium potential. The stripping/plating potential during the half cycle was averaged to generate the average operating potential. The difference between the average operating potential and the equilibrium was defined as the overpotential here. The overpotential for the stripping is high than plating in the initial cycling but levels off beyond 35 cycles. The overpotential for the plating remains low in before 20th cycle then started to grow afterward. The late take off of the plating overpotential and steady of stripping may implicate that the bromine crossover may have more effect on the plating process of Mg.

Figure 21:
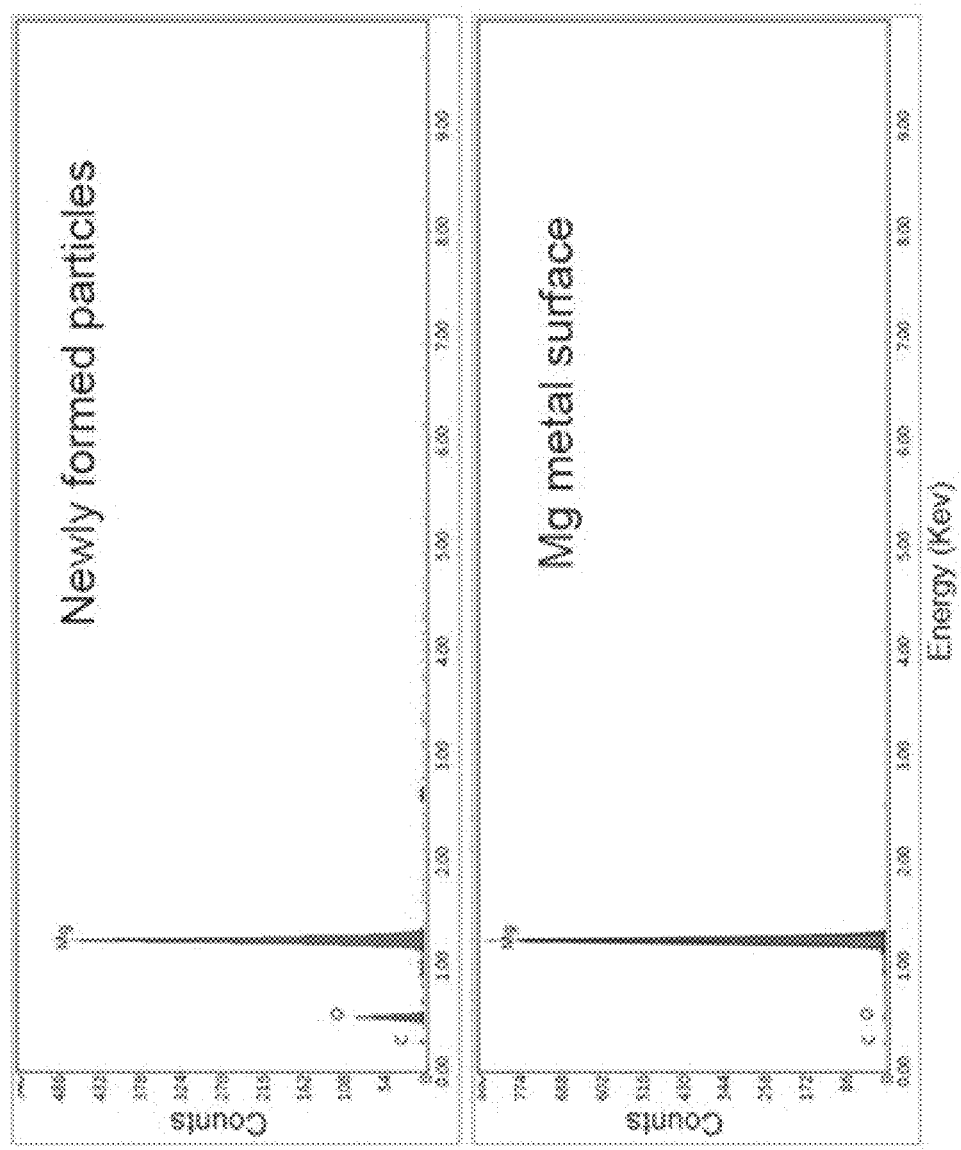

FIG. 21 shows EDX information of the Mg metal anode. EDX information of the Mg metal anode. The comparison was made between the newly deposited particles on Mg surface (C:O:Mg=13%:32%:55%) and the adjacent planar Mg surface (C:O:Mg=8%:2%:90%). The relatively high content of oxygen could come from two aspects: 1) the newly deposited Mg has high surface area so it is very reactive. It could be oxidized by the oxygen very quick during the sample transfer to the SEM chamber. Also the porous particle layers can contain high ratio of MgO. This could help to confirm the deposition of Mg. 2) the oxygen comes from the passivation layer that will inevitably form during the plating process. This is related to the imperfection of the current electrolyte system.

Figure 22:
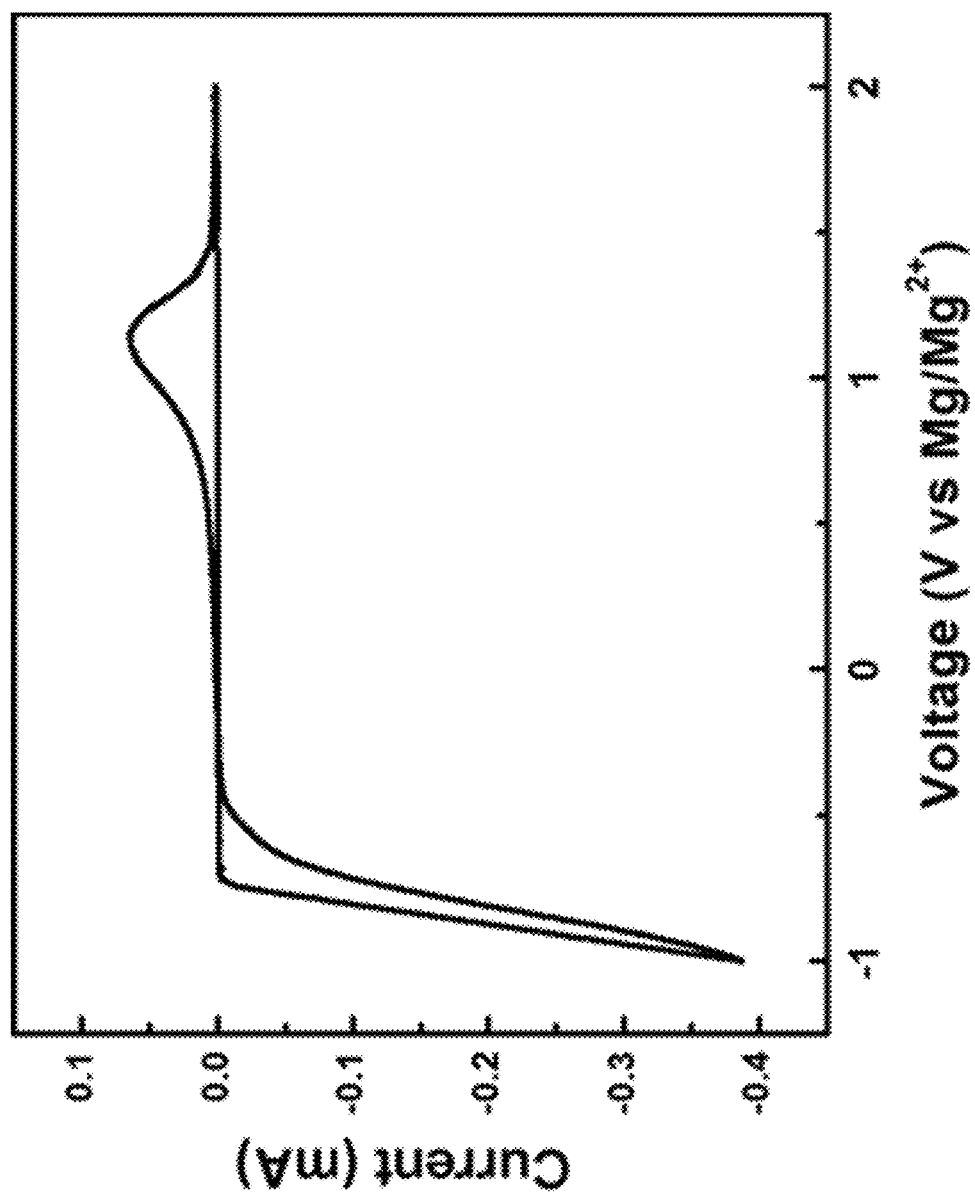

FIG. 22 shows CV of Pt electrode in the anolyte for the study of Mg plating and stripping. CV of Pt electrode in the anolyte for the study of Mg plating and stripping. The anolyte can enable Mg anode but the Coulombic efficiency for the Mg plating and stripping on Pt electrode is limited.

DETAILED DESCRIPTION OF THE INVENTION

The present disclosure is directed to a rechargeable non-aqueous Mg—$Br_2$ battery. Without further elaboration, it is believed that one skilled in the art can, based on the present disclosure, utilize the present invention to its fullest extent. The following specific embodiments and examples are, therefore, to be construed as merely illustrative, and not limitative of the remainder of the disclosure in any way whatsoever.

Owing to its low cost and high volumetric capacity, Mg is a promising anode material for energy storage applications. Previous research has identified the cathode chemistry as a major challenge that must be addressed for further development of Mg-based batteries. In response to this challenge, here the present invention shows $Br_2$-based conversion chemistry is a potential route toward rechargeable Mg-batteries. Compared with Mg-ion or Mg-air chemistries, the Mg—$Br_2$ system features fast kinetics and good cyclability. To solve the issues of poor electrolyte stability, a non-aqueous, dual-electrolyte scheme was employed in one embodiment for this proof-of-concept demonstration. The anolyte consisted of $Mg(TFSI)_2$ dissolved in a monoglyme and diglyme mixture. The catholyte was composed of $Mg(TFSI)_2$ in $PYR_{14}TFSI$ ionic liquid mixed with active bromine species. When Mg was used as the anode, an open circuit voltage of 3.0 V (vs. $Mg^{2+}/Mg$) was measured. The prototypical cell was successfully discharged and charged for over 20 cycles with consistently high coulombic efficiencies (ca. 96%).

The ionic liquid used in the present invention, $PYR_{14}TFSI$ (1-butyl-1-methylpyrrolidinium bis(trifluoromethanesulfonyl)imide) features relatively high anodic stability when compared with other organic solvents, sufficient solubility of $MgBr_2$, relatively low viscosity and no unsaturated bonds. These properties are desired for the utilization as the catholyte of Mg—$Br_2$ batteries. For the anolyte, 0.1 M $Mg(TFSI)_2$ was dissolved, where TFSI stands for bis(trifluoromethanesulfonyl)imide, in DME (dimethoxyethane) and diglyme (diethylene glycol methyl ether) (1:1 by volume). The choice here represents an optimized compromise between considerations of stability and performance. In one embodiment, the two electrolytes were connected by a fine porous glass frit (4 μm nominal pore size) which limits the diffusion of $Br_2$ to slow down the crossover but allows for exchange of $Mg^{2+}$ for small polarization. The full operation of this battery system can be described as follows. During discharge, the Mg anode was electrochemically oxidized to $Mg^{2+}$, and $Br_2$ was reduced on the carbon paper surface to $Br^-$. During recharge, $Br^-$ was oxidized back to $Br_2$ at the cathode and $Mg^{2+}$ was platted onto the Mg anode. As will be discussed later, $Br_2$ was found to readily bind with excess $Br^-$ to form polybromide complexes ($Br_n^-$, n=3, 5, 7 . . . ). This helps to stabilize the free $Br_2$ and the polybromides/bromide redox pair determines the equilibrium voltage. For the present invention, an attempt to eliminate the complex composition of polybromide was made by using an excess amount of $Br^-$, which makes the dominating polybromide specie to be $Br_3^-$. The voltage reported in aqueous solution for $Br_3^-/Br^-$ is nearly identical with that for $Br_2/Br^-$, but the value in aprotic solution varies depending on the solvent (0.6~0.7V vs SHE). The primary goal for the present invention is to utilize the conversion between $Br_3^-$ and $Br^-$ ($Br_3^- \leftrightarrow Br^-$) for a new electrochemical energy storage system. As such, unless noted, the active materials in the test are $MgBr_2$. The cyclic voltammograms (CV) of the anode and the cathode are presented in FIG. 1, where the equilibrium potentials of 0 V and 3 V (vs. $Mg^{2+}/Mg$; all voltages presented here are relative to $Mg^{2+}/Mg$) for the anode and the cathode, respectively, are clearly seen.

As discussed above, $Br^-$ is known to bind with $Br_2$ to form polybromide, $Br_n^-$ (n=3, 5, 7 . . . ). The distribution of the species is closely related with the relative ratio between $Br^-$ and $Br_2$. Consider $Br_3^-$ and $Br_5^-$ as an example. The quantity of $Br_5^-$ would be approximately 0 when $[Br_2]<0.5[Br^-]$; and the ratio of $Br_5^-/Br_3^-$ would reach 1:1 only when $[Br_2]>1.5[Br^-]$, which would need much more $Br_2$ than is in the system. So, with the excess amount of Br$^-$ in the solution, it is thought that the majority of the form of polybromide in the system will be Br$_3^-$.

Mg metal has long been considered the most promising anode material for the energy storage systems beyond Li-ion batteries. Its merits come from the nearly 2 times higher high volumetric energy density than Li metal, significantly improved safety promise and earth abundance. However, the realization of Mg metal battery has been limited by the lack of proper intercalation cathode materials, due to the sluggish Mg$_2^+$ diffusion in most solids. To address this challenge, the present invention breaks the constraint of the solid cathode and demonstrates conversion chemistry of Br$_2$/Br$^-$ in solution with fast kinetics and high energy density. Because of the known reactivity between Br$_2$ and most organic solvents, prior Br$_2$ cathode studies were limited to aqueous systems, making it difficult to utilize Mg metal as the anode. The problem is solved by the introduction of a dual electrolyte system. For the anode, a dimethoxyethane and bis(2-methoxyethyl) ether mixture is used, which is compatible with Mg. For the cathode, an ionic liquid (1-butyl-1-methylpyrrolidinium bis(trifluoromethanesulfonyl)imide) with excessive Br$^-$ as stabilizing agent is used. Together, this system enables a prototypical rechargeable non-aqueous Mg—Br$_2$ battery for the first time. A nominal operational voltage of 3.0 V, specific energy density of 290 mAh/gMgBr$_2$, Coulombic efficiency over 96% and lifetime of more than 20 fully discharge/charge cycles are achieved. The electrochemical and diffusion behavior are also further studied in depth to provide better understanding of the system for future improvement. The results introduce a new energy storage route toward low-cost, high-capacity and safe batteries.

In summary, the present invention realized a rechargeable battery using Mg metal as anode material and bromine species as cathode. It features high operating voltage, fast kinetics and high reversibility. The advantages of the present invention over non-rechargeable Mg batteries include: 1) reduce the demand for materials by repeated use of the same batteries rather than replacing them and 2) higher operational voltage provides higher energy density.

The advantages of the present invention over current commercialized Li batteries include: 1) Mg metal provides higher volumetric energy density than Li metal, 2) Mg metal anode does not suffer from a dendritic growth problem which provides a better safety feature and 3) Mg element is abundant and of lower cost than Li.

The advantage of the present invention over current rechargeable Mg batteries is ongoing and includes: 1) the conversion chemistry provides better kinetics and reversibility over intercalation chemistry, 2) electrochemically stable catholyte with voltage limit up to 3.7 V vs Mg$^{2+}$/Mg, and 3) chemically stable catholyte with no known reaction with bromine species, and 4) reversibility and energy efficiency is greatly improved.

The present invention could be used in applications where a demand of energy storage is presented, that include but not limited to: 1) electric vehicles, 2) mobile electronics, 3) home appliances, 4) household stationary energy storage, and 5) grid scale energy storage for demand response, 6) drones, 7) redox flow battery developments, and 8) Mg battery developments.

The development for next generation energy storage demands for higher energy density, higher power density, lower cost and better safety. The state-of-art Li-ion battery is still far from desired. The limited energy density and power density are related with the intercalation chemistry governing the electrode reactions. The present invention adopted conversion chemistry which reduced the redundant material to minimal to boost the energy density and therefore the conversion chemistry is much faster than intercalation chemistry to boost the power density. The cost issue is related with the material utilized in the system (abundancy of the elements) and fabrication (material sensitivity and packaging). This invention utilized non-precious and earth abundant elements: Mg and Br, as the active material. Furthermore the less reactive and non-dendritic plating of Mg compared with Li will greatly lower the fabrication cost and increase the safety feature.

In one embodiment of the present invention, there is provided an electrochemical cell comprising (i) an anode comprising Mg, (ii) a cathode comprising a carbonaceous material as current collector, (iii) an anolyte in contact with the anode, said anolyte comprises a non-aqueous composition that allows for reversible Mg platting and stripping, and (iv) a catholyte in contact with the cathode, said catholyte comprises active bromine species and a non-aqueous composition that is stable toward the active bromine species, wherein the anolyte and catholyte are contained in two separate chambers, said chambers are connected via a porous barrier. In one embodiment, the porous barrier is a porous glass frit or membrane. In another embodiment, the porous barrier has a nominal pore size of 4 µm or less. In one embodiment, the active bromine species can be one or more of Br$_2$, Br$_3^-$, or Br$_5^-$.

In one embodiment, the anolyte of the present invention comprises Mg(TFSI(bis(trifluoromethanesulfonyl)imide))$_2$ dissolved in a monoglyme and diglyme mixture. In one embodiment, the monoglyme and diglyme mixture comprises DME (dimethoxyethane) and diglyme (diethylene glycol methyl ether) in a 1:1 ratio by volume.

In one embodiment, examples of compositions that can be used as the anolyte include, but are not limited to, 1:1 of Mg(TFSI):MgCl$_2$ in THF (THF: tetrahydrofuran), 2:1 of MgCl$_2$:AlCl$_3$ in DME, 2:1 PhMgCl:AlCl$_3$ in THF (Ph: phenyl group), and PhMgBr in THF.

In one embodiment, the catholyte of the present invention comprises Mg(TFSI)$_2$ in PYR$_{14}$TFSI (1-butyl-1-methylpyrrolidinium bis(trifluoromethanesulfonyl)imide). Examples of compositions that can be used as the catholyte in the present invention include, but are not limited to, propylene carbonate, dimethyl sulfoxide, dimethoxyethane, 1-Butyl-3-methylimidazolium tribromide, and acetonitrile.

In one embodiment, the carbonaceous material in the present electrochemical cell comprises carbon in whole and in part. In one embodiment, the carbonaceous material comprises graphite, carbon fiber, carbon paper, glassy carbon, or amorphous carbon. In another embodiment, the carbonaceous material is configured as a sheet, a film, a foil, a tube, or a rod.

The present invention also provides a rechargeable magnesium battery comprising one or more of the electrochemical cell described above. In one embodiment, the anolyte of the rechargeable magnesium battery comprises Mg(TFSI(bis(trifluoromethanesulfonyl)imide))$_2$ dissolved in a monoglyme and diglyme mixture. In one embodiment, the monoglyme and diglyme mixture of the rechargeable magnesium battery comprises DME (dimethoxyethane) and diglyme (diethylene glycol methyl ether) in a 1:1 ratio by volume. In one embodiment, the anolyte can be a composition of 1:1 of Mg(TFSI):MgCl$_2$ in THF (THF: tetrahydrofuran), 2:1 of MgCl$_2$:AlCl$_3$ in DME, 2:1 PhMgCl:AlCl$_3$ in THF (Ph: phenyl group), or PhMgBr in THF.

In one embodiment, the catholyte of the rechargeable magnesium battery comprises Mg (TFSI)$_2$ in PYR$_{14}$TFSI (1-butyl-1-methylpyrrolidinium bis(trifluoromethanesulfonyl)imide). In another embodiment, the catholyte can be a composition of propylene carbonate, dimethyl sulfoxide, dimethoxyethane, 1-Butyl-3-methylimidazolium tribromide, or acetonitrile.

In another embodiment of the present invention, there is provided an electrochemical cell comprising (1) an anode comprising Mg, (2) a cathode comprising a carbonaceous material as current collector, and (3) a non-aqueous composition in contact with said anode and cathode, said composition comprises active bromine species and allows for (i) reversible Mg platting and stripping, and (ii) is stable toward said active bromine species. In one embodiment, the active bromine species can be one or more of Br$_2$, Br$_3^-$, or Br$_5^-$. In one embodiment, such electrochemical cell further comprises a polymeric Mg$^{2+}$ conductor to reduce diffusion of polybromide species. In another embodiment, such electrochemical cell further comprises a solid state Mg$^{2+}$ conductor to reduce diffusion of polybromide species. Examples of non-aqueous composition useful in such electrochemical cell include, but are not limited to, MgCl$_2$ or MgBr$_2$ dissolved in 1-(2-(2-(2-Methoxyethoxy)ethoxy)-ethyl)-1-methylpyrrolidinium Bis(trifluoromethylsulfonyl)imide (MPEG3PyrTFSI), and methoxypolyethylene glycol (MW 350) Bis(trifluoromethylsulfonyl)imide (MPEG7PyrTFSI). In one embodiment there is also provided a rechargeable magnesium battery comprising one or more of such electrochemical cell.

EXAMPLES

The following examples are provided to illustrate embodiments of the present invention but are by no means intended to limit its scope. The examples described herein will be understood by one of ordinary skill in the art as exemplary protocols. One of ordinary skill in the art will be able to modify the below procedures appropriately and as necessary.

Methods and Experimental Procedures
Chemicals and Materials

MgBr$_2$, DME, Diglyme and liquid bromine (all anhydrous grades) were purchased from Sigma-Aldrich. The solvents were further dried with 4 Å molecular sieves prior to use and MgBr$_2$ were further dried in vacuum at 150° C. Mg metal (Ribbon, ≥99% trace metals basis, Sigma-Aldrich) was scraped by a blade to remove the surface passivation layer before usage. Mg(TFSI)$_2$ and PYR$_{14}$TFSI were purchased from Solvionic and further dried under vacuum at 240° C. and 150° C. overnight, respectively. Carbon paper (Toray 120) as cathode current collector was purchased from the Fuel Cell Store and cleaned sequentially by acetone, methanol and isopropanol, then dried under vacuum at 120° C. before use.

Electrochemical Tests 0.1 M Mg(TFSI)$_2$ was dissolved in the mixture of DME and diglyme in a 1:1 ratio by volume to be used as the anolyte and in the pure PYR$_{14}$TFSI as the catholyte. A custom-made cell with two glass chamber connected by a glass frit (fine grade, thickness: 2 mm, diameter: 1 cm, pore diameter: 4 μm) was used for testing. Two scraped Mg metal strips were inserted into the anolyte to serve as the counter and reference electrode, respectively. Carbon paper was immersed in the catholyte as the working electrode for the bromine chemistry. Stirring was achieved with a magnetic stirring bar. The immersed area varied between 0.5-1 cm$^2$ for samples measured for this study. The volume of the anolyte and catholyte were both 2 mL. Varying amount of MgBr$_2$ was added to the catholyte as electroactive material (the specific amount is noted for each test throughout the Communication). Liquid Br$_2$ was used to generate various high concentration of Br$_3^-$ in the catholyte for the overpotential measurements and Raman characterization. All electrochemical tests were performed in an Argon glovebox (Mbraun, O$_2$ and H$_2$O<0.1 ppm) at room temperature.

Coulombic Efficiency Measurements 0.05 M MgBr$_2$ was dissolved in PYR$_{14}$TFSI solution with 0.1 M Mg(TFSI)$_2$ as the supporting electrolyte. The full cell was assembled in a configuration as described above. Constant current of 0.4 mA/cm$^2$ was applied to charge the cell for 2 h and discharged to the cut off voltage of 1.5 V vs Mg metal reference electrode. The discharge capacity dived by charge capacity gives the Coulombic efficiency. Then the cell was continuously cycled using the same parameters for 20 cycles. The average voltages were calculated by averaging the discharge or recharge voltage over time.

Faradic Efficiency Measurements 30 mM Ferrocene (Fc) in DME solution was prepared and stored in a glovebox. For each test, 1.6 mL of Fc in DME solution was used as the reagent. 0.2 mL sample (ionic liquid with active bromine species) was added to the Fc solution. The UV-Vis spectra of the resulting solution were then collected using an Ocean Optic USB4000 spectrometer and the peak intensity at 618 nm was used as a quantification standard. Ferrocenium (Fc$^+$) hexaflouraphosphate was used as the standard to generate the calibration curve and pure 1.6 mL DME+0.2 mL ionic liquid solution was used as the blank background.

Raman Characterizations

Raman spectra were obtained using an XploRA micro-Raman system (Horiba) with an excitation laser of 532 nm. A liquid sample was dropped onto a thin glass plate and the laser was focused on the top surface of the droplet. Pure ionic liquid was used as received. Ionic liquid with Br$_2$ sample was prepared by pre-mixing the liquid Br$_2$ with ionic liquid and the reddish solution on the top was extracted for test. (Cautions: Liquid Br$_2$ is volatile and corrosive to inhale systems and skins, adequate ventilation or encapsulation of the sample stage is needed.) The discharged samples at different stages were obtained by extracting the catholyte after the discharge operation from Br$_2$, without pre-addition of any MgBr$_2$.

SEM Characterizations

SEM images were taken using a JEOL 6340F microscope operating at 10 KV and 20 KV. Energy-dispersive X-ray spectroscopy was taken by the TEAM system (EDAX) attached to the SEM. All samples were soaked and washed by DME 3 times to remove remaining salts and further dried under vacuum to remove DME before loading into the SEM chamber.

Results and Discussion

With the fundamental operation principles established, the first task was to examine the full charge/discharge characteristics. To ensure the full consumption of the starting material, two configurations were adopted for the charge/discharge but plotted in one figure (FIG. 2A) for illustration purposes. For the charging process, the exact amount of MgBr$_2$ (15 mol, 7.5 mM; 0.8 mAh, 4 Ah/L) was added to the catholyte. The cell was then charged with a constant current (0.4 mA/cm$_2$, normalized to the projected area of the carbon paper current collector). A relatively high initial voltage (ca. 3.4 V) was observed (FIG. 2A, where the capacity was normalized to the effective mass of MgBr$_2$).

Figure 2:
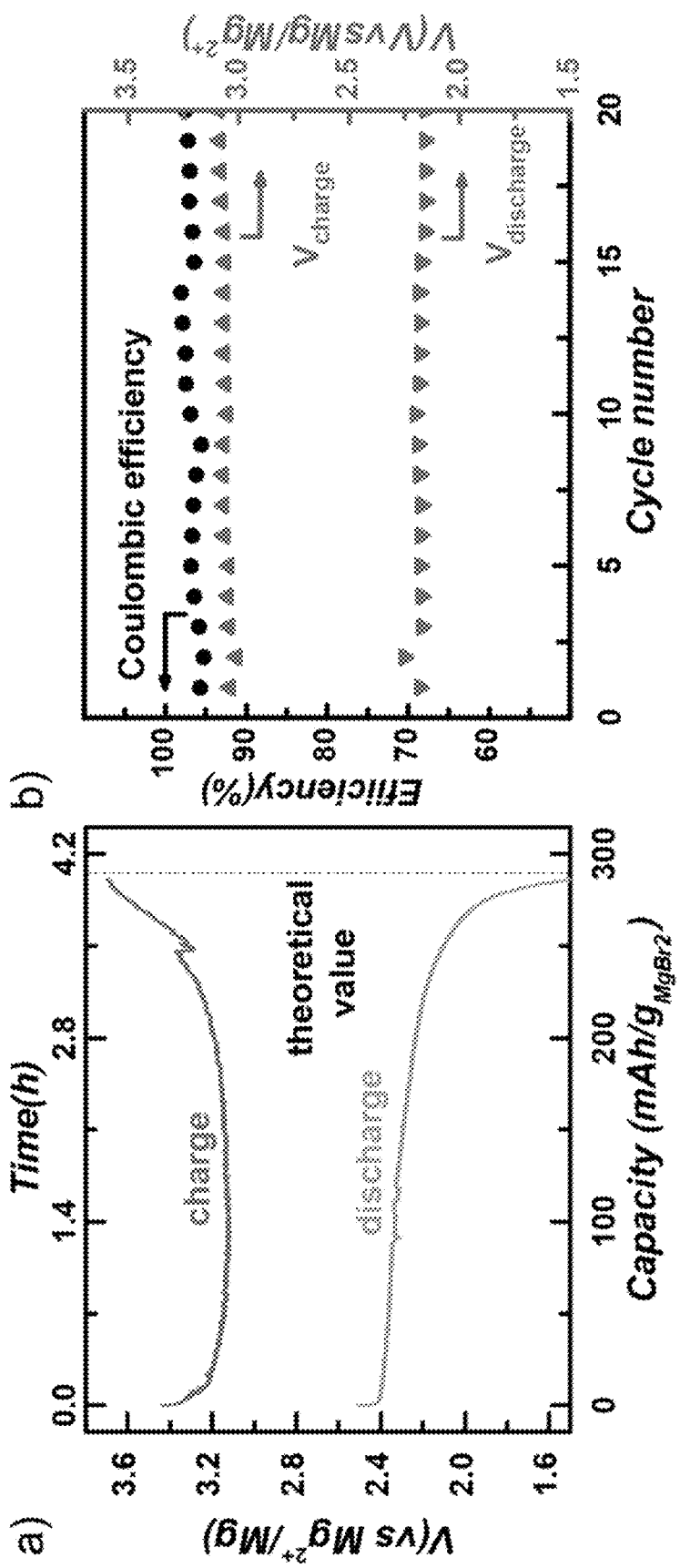
FIGS. 2A-B show electrochemical performance.

Several reasons may be responsible for the observation of a high initial voltage. They include poor initial catalytic activity of the carbon paper, poor initial diffusion of $Br^-$ to the pores in the carbon paper and reactions dominated by $Br_2/Br^-$ at the beginning of recharge. For reasons to be discussed later, the phenomenon is attributed to poor initial diffusion of $Br^-$. It is nevertheless important to note that the feature as seen in FIG. 2A is highly reproducible and was observed in all five measurements conducted for this portion of the study. The voltage quickly dropped to a plateau at ca. 3.1 V, which likely corresponds to the continuous oxidation of $Br^-$. Toward the end of the charging process, when $Br^-$ in the solution was being depleted, the potential gradually increased and reached the cut-off voltage of 3.7 V. To study the discharge behavior, first 0.05 M $MgBr_2$ was pre-oxidized to the equivalent of 0.8 mAh (4 Ah/L, 15% of Br– utilization, FIG. 7A) to get a known amount of $Br_3^-$ in the solution and then carried out $Br_3^-$ reduction reactions. The characteristic voltage-capacity trace is also shown in FIG. 2A. It is seen that the system quickly reached a discharge plateau of ca. 2.4 V, which then gradually decreased to 2.0 V before a rapid decrease was observed at 275 mAh/$gMgBr_2$ (theoretical value: 290 mAh/$gMgBr_2$). The sudden decrease of the discharge potential corresponds to the depletion of $Br_3^-$. As will be shown later, the measured charges are indeed connected to the conversion chemistry between $Br^-$ and $Br_3^-$ ($3Br^- - 2e^- \leftrightarrow Br_3^-$) with a Faradaic efficiency of ca. 95%.

Figure 7:
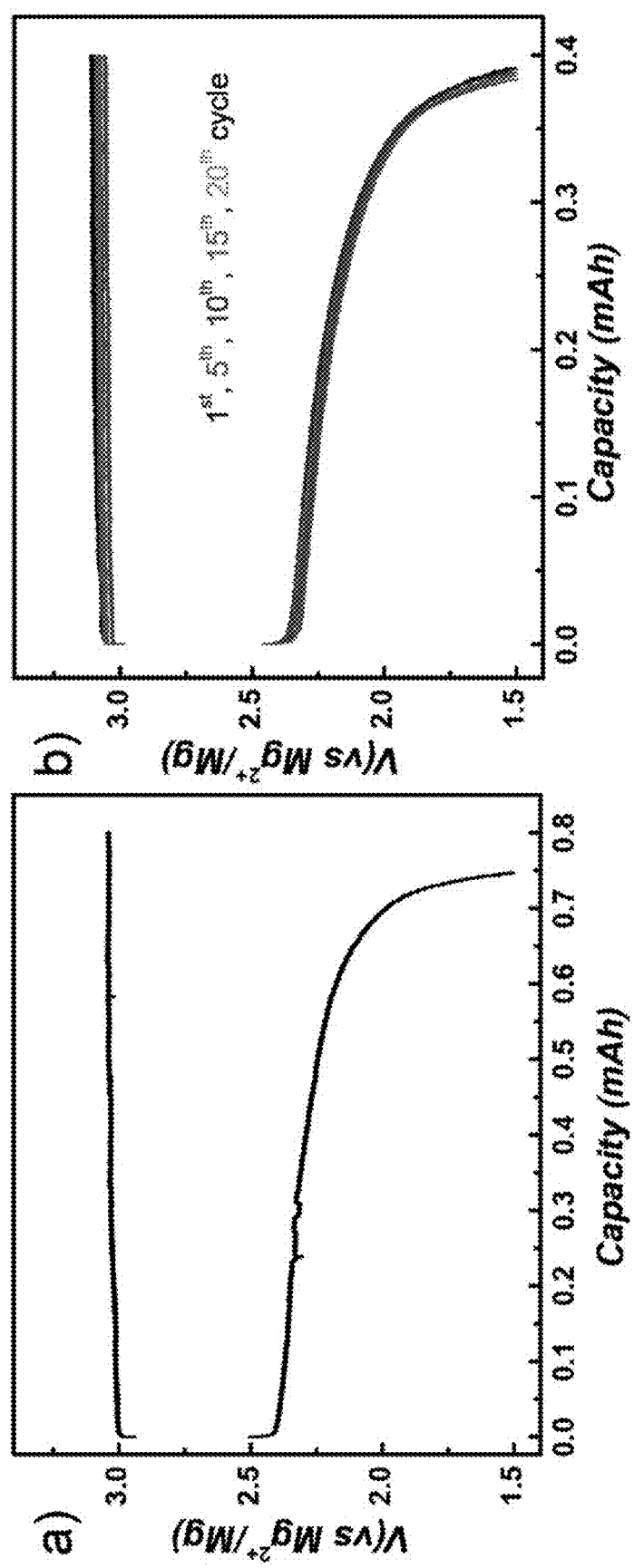
FIGS. 7A-B show detailed voltage profiles of the cell starting from $MgBr_2$. Detailed voltage profile of the cell starting from $MgBr_2$.
Figure 8:
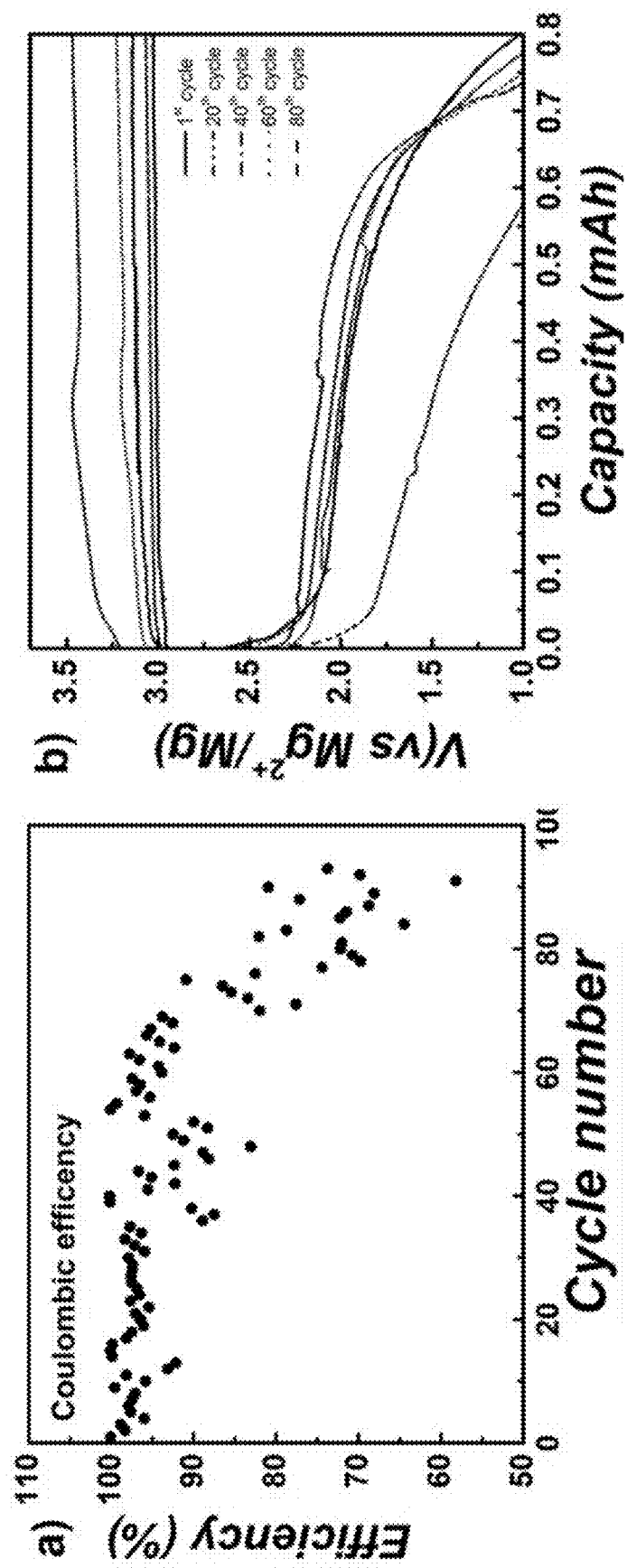
FIGS. 8A-B show extended battery life time test. Extended battery lifetime test. With limited amount of $MgBr_2$ (0.05M) in the solution, the charge/fully discharge depth was doubled (0.8 mAh) for accelerated degradation test. Coulombic efficiency was recorded as FIG. 8A and representative voltage-capacity profile was plotted in FIG. 8B. Absolute current: 0.2 mA, charging time: 4 h, utilization of total Br- during charging: 15%.

Next, the cyclability of the system was tested. The starting material was 0.05 M $MgBr_2$ in the catholyte. It was first charged for 2 h at 0.4 mA/cm² (7.5% of total Br– utilized) and then was discharged until the voltage dropped to the cut-off of 1.5 V. (FIG. 7B) The Coulombic efficiencies were calculated as the ratios between the discharge and charge capacities ($C_{discharge}/C_{charge}$ as shown in FIG. 7B, which was consistently ca. 96% (FIG. 2B). It is noted that at the end of the 20th cycle, no obvious sign of degradation was observed. The experiment was terminated artificially. More detailed voltage-capacity profiles of the data set are presented in FIG. 7, where the results of prolonged degradation test are also included (15% utilization of $Br^-$, FIG. 8). As such, the 20-cycle performance should represent a lower bound of the cyclability for full discharge operations. Also shown in FIG. 2B are the average charge and discharge potentials (ca. 3.1 V and ca. 2.2 V, respectively) for each cycle. An average round trip efficiency of 70% was obtained. This value can be improved if the relatively high overpotential could be reduced. Possible reasons for the overpotential are the low concentration of the active species, high internal resistance of the electrolyte and membrane, high viscosity of the ionic liquid and the possible surface passivation of the electrodes. Generally, high active material concentration and low current density favor low overpotentials.

Figure 9:
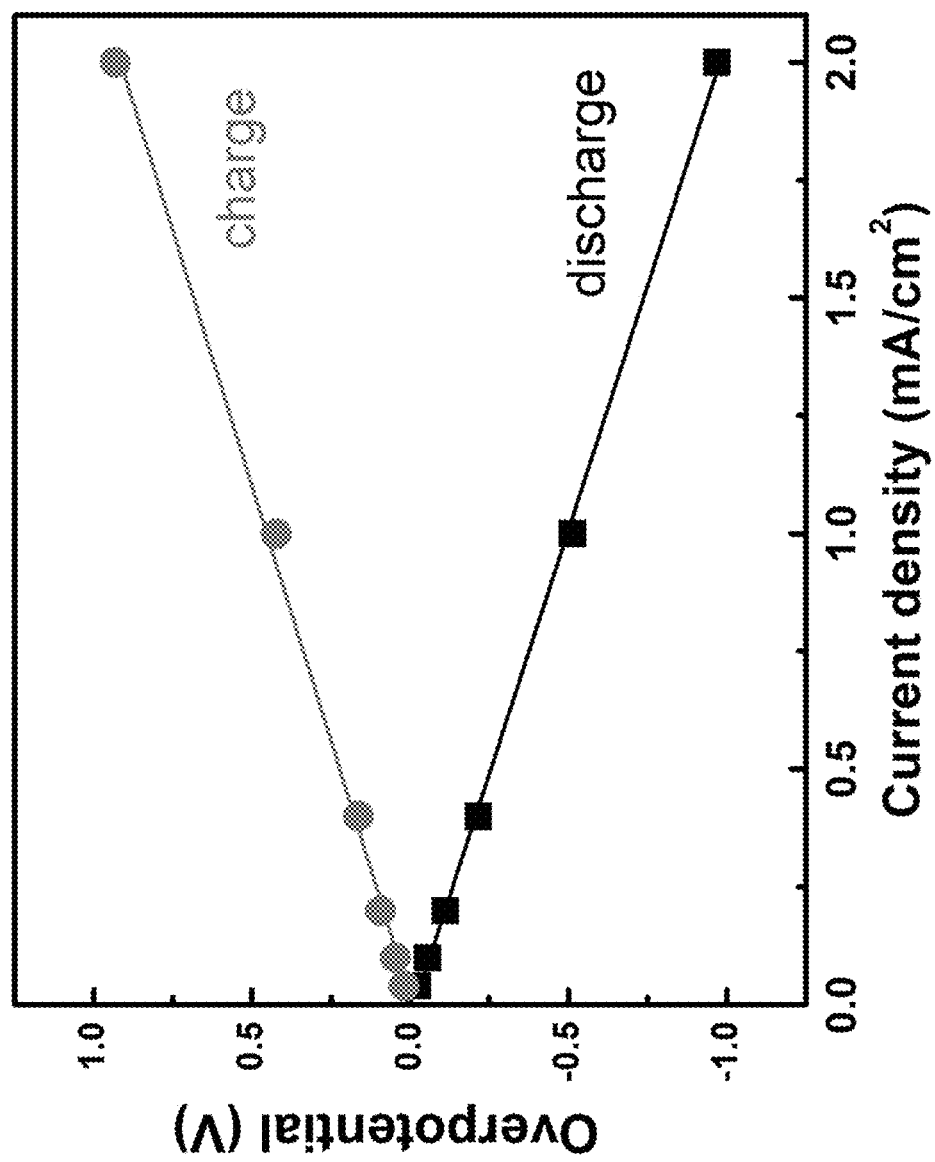
FIG. 9 shows overpotentials on the cathode vs the current density. Overpotentials on the cathode vs the current densities. The observed linear relationship indicates that iR drop is the likely reason of the overpotential in the tests.

Low current density favors low kinetic overpotentials. For this set of experiments, liquid $Br_2$ was introduced to obtain high concentration of bromine species in the solution to eliminate the concentration effect. A concentrated $Br_2$ solution (4 M) was used to start stabilized by $Br^-$ in the catholyte and performed discharge at 0.04 mA/cm² first. As shown in FIG. 3A, a low overpotential (23 mV) was measured. The cell was then recharged under the same current density, and a similarly low overpotential (19 mV) was observed. Note that as the purpose for this set of experiments was to characterize how the overpotentials depend on the current densities, the cell was only discharged and charged to a low depth in terms of capacities. After the first cycle, the discharge current density was increased to 0.1 mA/cm², and an overpotential of 55 mV was measured (FIG. 3A). A near linear dependence of the overpotential with the current density (e.g., 0.11 V for 0.2 mA/cm²; 0.21 V for 0.4 mA/cm²; and 0.51 V for 1 mA/cm²; also see FIG. 9) was measured. Such a linear dependence strongly supports that the observed overpotential is due to the iR drop but not the kinetics. The latter would predict an exponential dependence of the overpotential on the current densities. It is important to note that the open circuit voltage of 3.0 V was stable and consistent for different batches of cells examined here, which was dominated by the $Br_3^-/Br^-$ redox pair.

High concentration of active materials minimizes polarization in the solution due to the limitations of diffusion and thus minimizes overpotentials. When the concentration of the active material was decreased from 4 M to 2 M, a higher discharge overpotential (0.56 V) was observed at 0.1 mA/cm² current density (FIG. 3B). The recharge overpotential (0.18 V) was also higher. Note that at low active material concentrations, the discharge overpotential increases disproportionally relative to the recharge overpotential. Both effects can be further confirmed by relating to the data in FIG. 2A, which only 7.5 mM $Br^-$ or $Br_3^-$ was used as the active material. This also supports the hypothesis that $Br_2$ diffusion is a major limiting factor in defining the performance of Li—$Br_2$ batteries.

Another concern of the system centers on the performance of the Mg anode, since high overpotentials have been previously reported on the striping and plating of Mg. To characterize the anode overpotentials, the anode potentials against a Mg reference (placed in the anolyte to avoid the reaction with $Br_3^-$ or $Br_2$) were monitored simultaneously with the cathode potential. The data are shown in FIG. 3B. It is seen that initially the overpotential on the anode was minimum. As the cycle number was increased, more overpotentials are needed to plate Mg. The increase of the overpotential is likely connected to the formation of a passivation layer on the Mg electrode. The observation is consistent with reports that surface passivation layers would make Mg striping and plating, especially the latter, more difficult.

Figure 4:
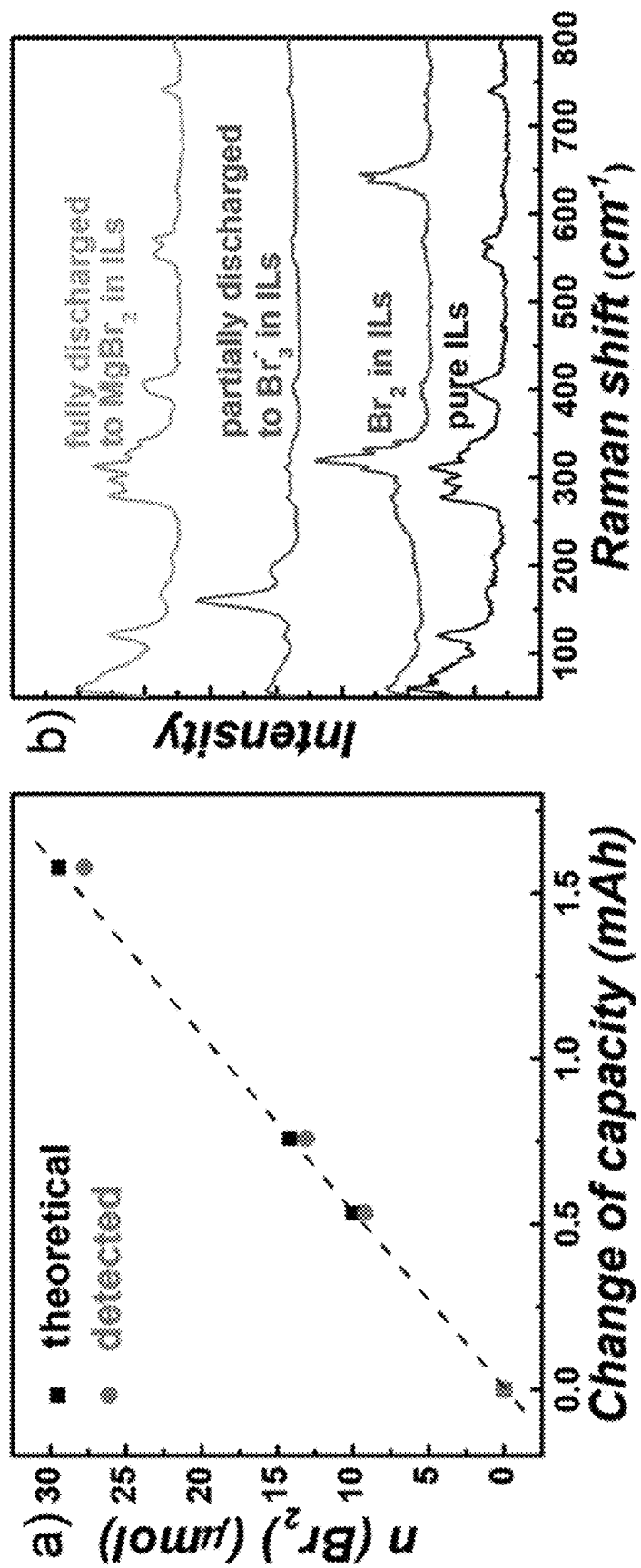
FIGS. 4A-B show product detection.
Figure 10:
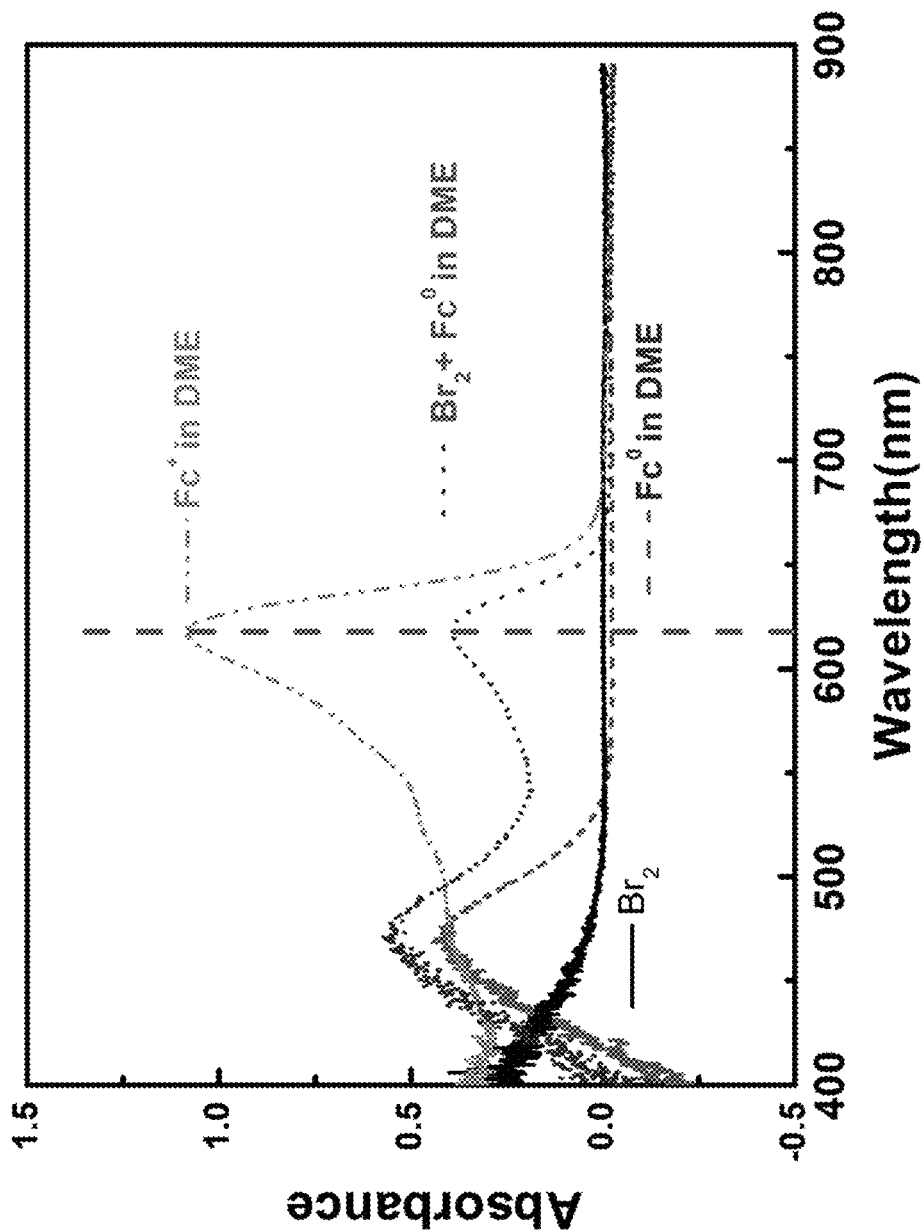
FIG. 10 shows UV-Vis spectra of $Fc^0$ and $Fc^+$. UV-Vis spectra of $Br_2$ in DME (red); ferrocene)($Fc^0$ in DME (yellow); ferrocenium hexafluorophosphate ($Fc^+$) in DME (blue); the mixture of the catholyte after charging from $MgBr_2$ with excess $Fc^0$ in DME solution (green). No absorbance of either $Br_2$ or $Fc_0$ could be observed at the wavelength of 618 nm. Ferrocenium ion is the only species in the system that absorbs at 618 nm.
Figure 11:
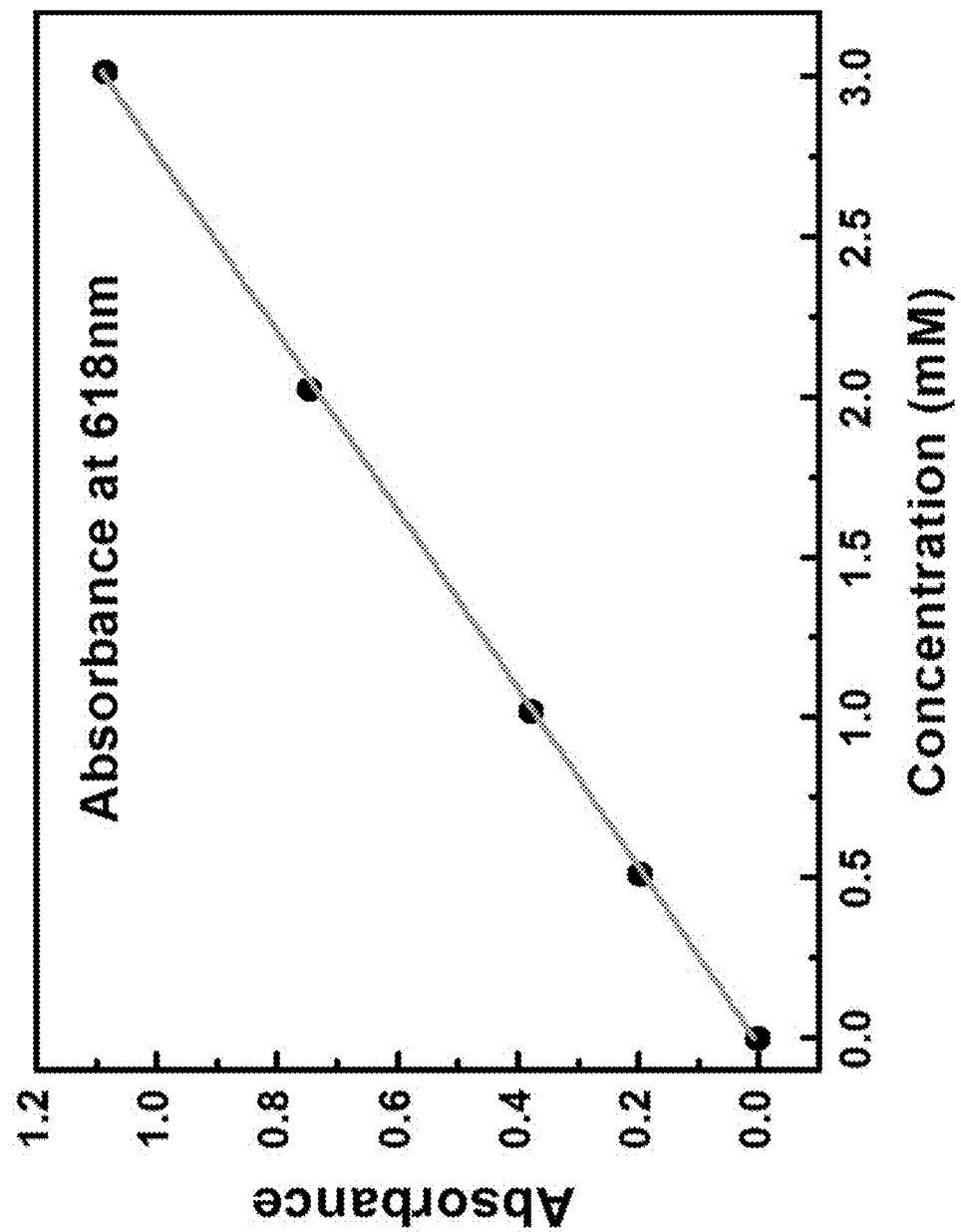
FIG. 11 shows calibration curve of $Fc^+$ concentration. Calibration curve between the concentrations of $Fc^+$ solution in DME and the absorbance at 618 nm wavelength.

Next, product detection was carried out to corroborate the measured electrochemical characteristics with the purported $Br_2$ redox chemistry. The recharge product was quantified by adding the resulting catholyte to a DME solution with excess amount of ferrocene (Fc). $Br_3^-$ (or $Br_2$) would quantitatively oxidize Fc to $Fc^+$, which was then quantified by its distinct absorption peak at 618 nm (FIGS. 10-11). The quantity of $Br_3^-$ (or $Br_2$) was calculated by these measurements. Note that here the measurements quantify the number of electrons passed during recharge. There is no difference whether the electrons are from $2Br^- \rightarrow Br_2$ or from $3Br^- \rightarrow Br_3^-$ (2-$e^-$ process). As such, $Br_2$ is not distinguished from $Br_3^-$ for this set of experiments. The data are plotted in FIG. 4A and compared with the expected values as calculated from the capacities. A Faradic efficiency of 95% was obtained. The efficiency coincides with the Coulombic efficiencies as presented in FIG. 2B. It is suspected that $Br_2$ diffusion through the glass frit during recharge was the main cause for the unaccounted 5% Faradaic efficiency loss. To detect the discharge product of $Br^-$, a catholyte was used to start containing only $Br_2$ at the beginning. $Br_2$ was electrochemically reduced in the catholyte and used Raman spectroscopy to detect the $Br_3^-$ signal (160 cm$^{-1}$, $\Sigma_g^+$ band, symmetric stretch) at different stages of reduction (FIG. 4B). The reduction of $Br_2$ produces $Br^-$ which will bind with excess $Br_2$ to form polybromides, $Br_n^-$. At 50% depth of discharge the majority of the species in the solution is $Br_3^-$ ($Br_2:Br^- =$ 1:2 in the solution). After further discharge, the yellowish color faded resulting in a transparent solution. The Raman signal of $Br_3^-$ also diminished. The species in the solution became $MgBr_2$ which exhibits no detectable Raman features in the ionic liquid. While the detection is qualitative in nature, the disappearance of $Br_3^-$ at the final stage shows the electrochemical reduction process from $Br_3^- \rightarrow Br^-$ could be complete.

Figure 5:
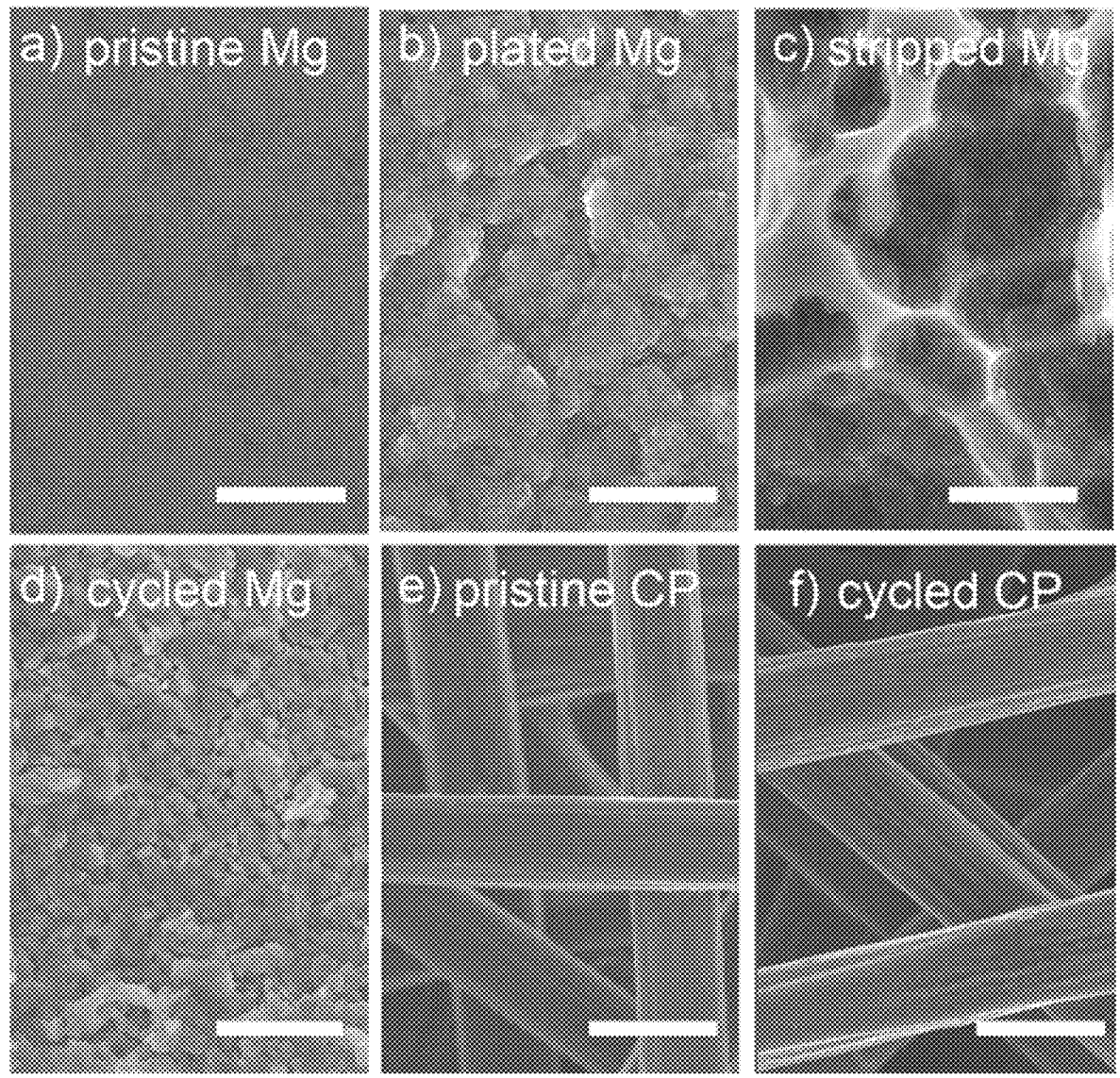
FIGS. 5A-F show SEM images of the anode and cathode after different operations.
Figure 6:
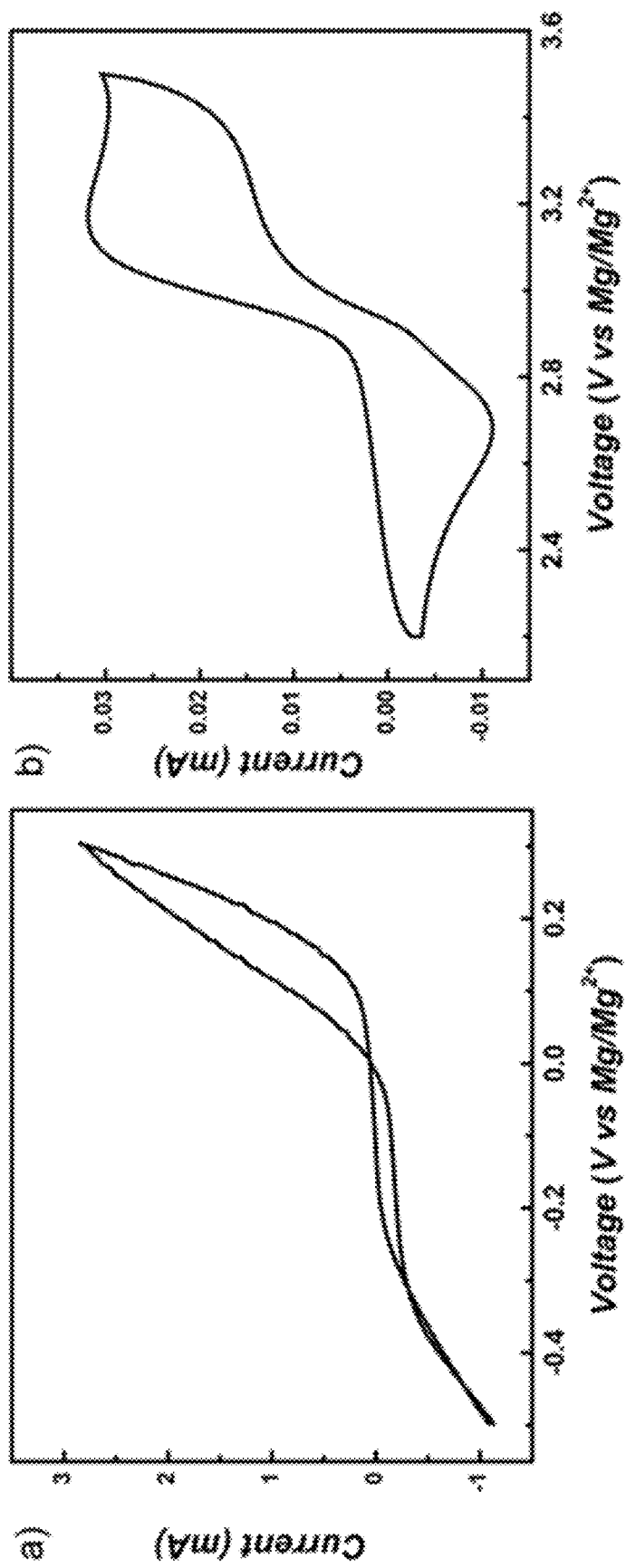
FIGS. 6A-B show CV scans of the anode and cathode chemistries. Original data of CV scans of the anode and cathode tested separately.
Figure 12:
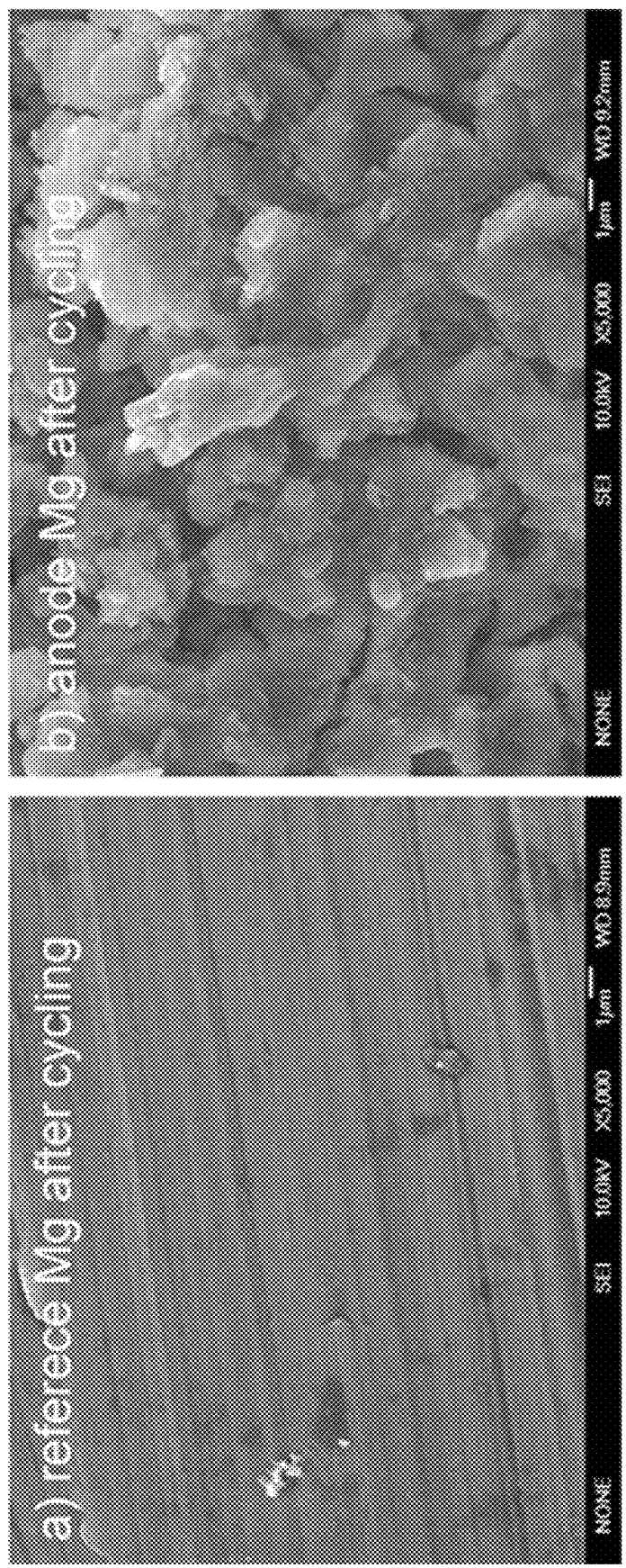
FIGS. 12A-B show SEM images of carbon paper, reference electrode and anode after cycling.

After proving that the cathode can reversibly produce and consume $Br_3^-$ species as expected, how the anode changed due to Mg plating and stripping was next examined. Scanning electron microscopy (SEM) was employed for this portion of the study. The fresh Mg metal surface was smooth and featureless, as shown in FIG. 5A. After charging, aggregated Mg particles were observed on the smooth surface, with no signs of dendritic growth (FIG. 5B). For the anode after discharge, the etching of Mg surface is evident by holes created due to dissolution of $Mg^{2+}$ (FIG. 5C). After 60 cycles from the test performed in FIG. 3B, the anode surface was covered by a relatively compact layer of coating (FIG. 5D) that was not observed after the initial recharge. This feature may help explain the increasing overpotentials over time, as shown in FIG. 3B. To further show that the morphology change of Mg surface was due to the repeated plating/stripping of Mg rather than the etching from bromine species, the surface of counter electrode and reference electrode from the same chamber after prolonged cycling tests were compared (FIG. 12). The surface of the reference electrode remained smooth and the strips from the initial polishing of oxidation layer prior to cycling were still visible. The data further support that the roughening of the surface is due to striping and plating of Mg. By comparison, the morphology of the carbon paper cathode remained unchanged during the cycling performance except for some residual salts and swelling of the carbon fibers. Presumably because the operating condition was far less than the saturation condition of $MgBr_2$, no bulky insoluble product or by-product was observed. No obvious corrosion of the carbon paper was seen, either. Such a feature could be a major advantage of Mg—$Br_2$ battery over oxygen batteries, as the reactivity between carbon and reactive oxygen species has been identified as a major issue.

Figure 1:
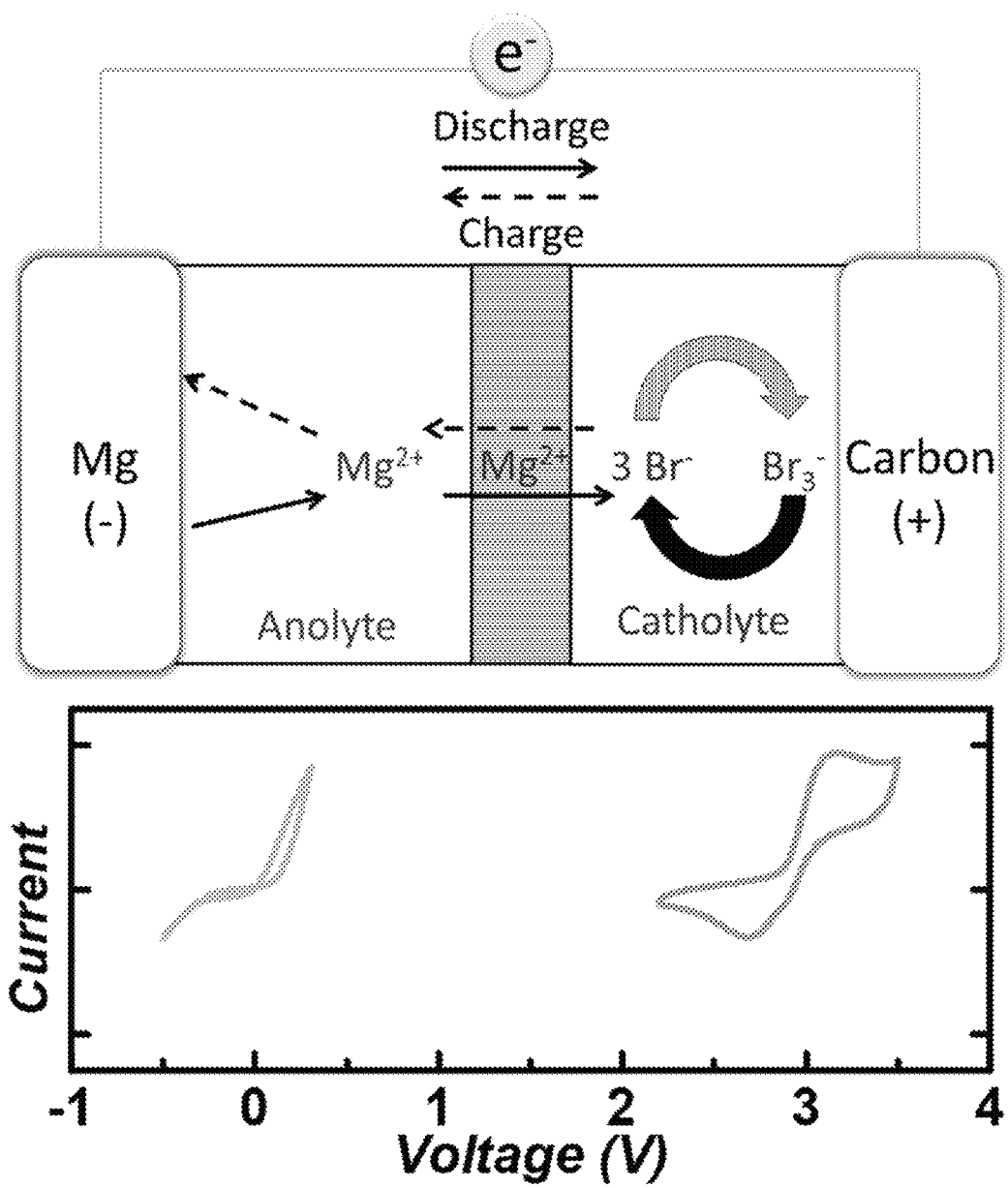
FIG. 1 shows the design principle of the Mg—Br$_2$ battery. Top: Schematic illustration of the Mg—Br$_2$ battery design, where Mg metal serves as the anode, and Br$_2$ with carbon paper current collector serves as the cathode. The catholyte consists of PYR$_{14}$TFSI and the anolyte is made of DME and diglyme (1:1 ratio by volume). Bottom: Cyclic voltammetry of the anode (gray trace, left) and the cathode (orange trace, right). The current densities are normalized for illustration purposes. Original data are presented in FIGS. 6A-B.
Figure 13:
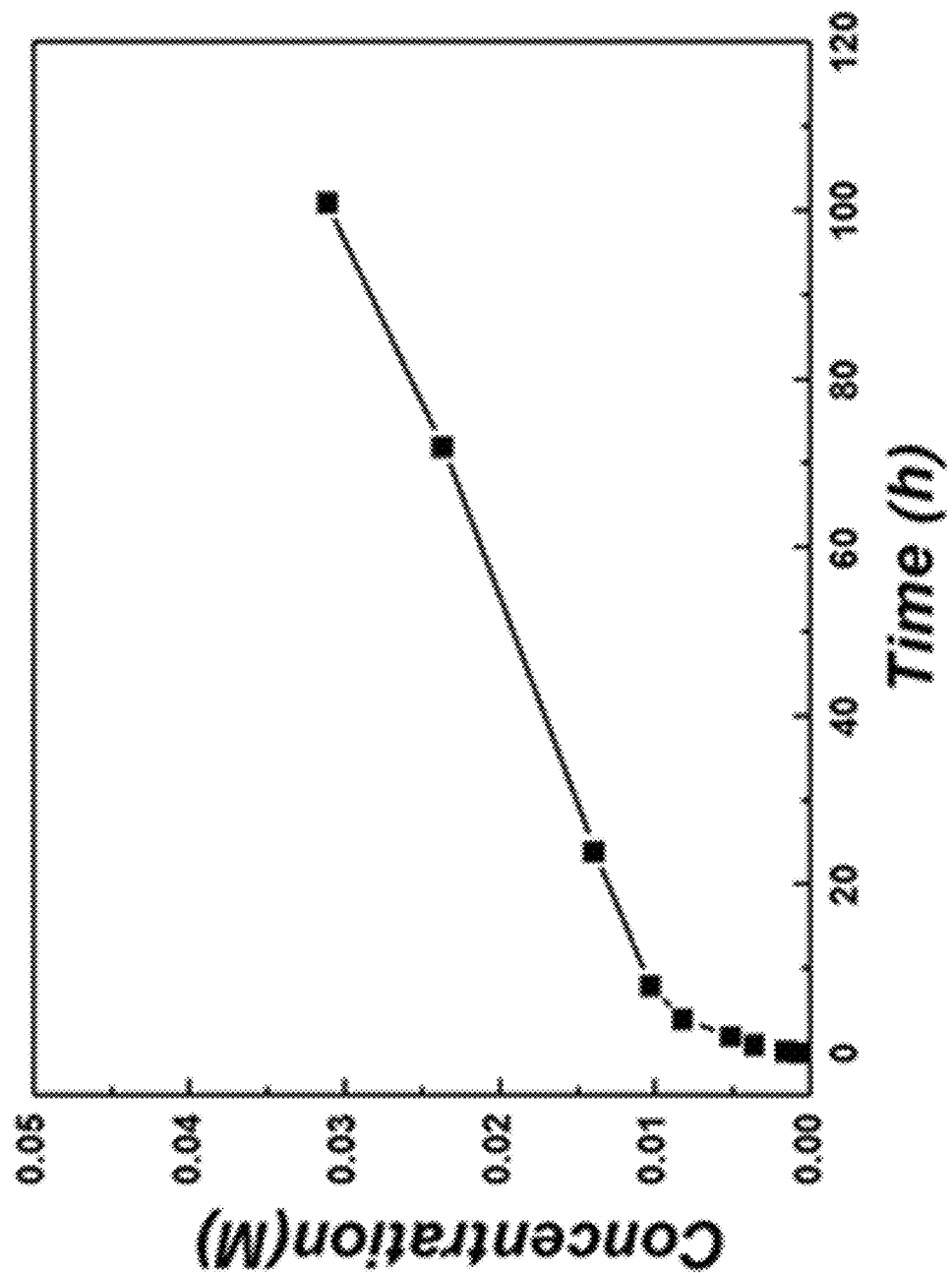
FIG. 13 shows characterization of the $Br_2$ species crossover rate through the glass frit. Characterization of the $Br_2$ species crossover rate through the glass frit. The same glass testing cell with two chambers connected by the glass frit was tested. 2 mL of 1M $Br_2$ in $PYR_{14}TFSI$ was put in one chamber and used as the diffusion source. 2 mL pure $PYR_{14}TFSI$ was put in the other chamber as the receiving solution to be analyzed. The receiving solution was constantly stirred to make sure the solution is homogenous for sampling. Samples were taken out at 5 min, 10 min, 1 h, 4 h, 8 h, 24 h, 72 h and 100 h and the bromine concentrations were quantified by the Ferrocene method similar as described in FIG. 10-11.

The present invention represents a significant step forward when compared with previous efforts of studying $Br_2$ chemistries in aqueous electrolytes. Due to the lack of functional room temperature $Mg^{2+}$-conductive solid-state electrolytes, it is unclear how to implement an aqueous Mg—$Br_2$ battery. The present invention circumvents the problem. As shown in FIG. 13, the effect of the glass frit in slowing down $Br_2$ diffusion is adequate for the proof-of-concept demonstration of the present invention. Moving forward, polymeric $Mg^{2+}$ conductors such as PVdF (polyvinylidene difluoride)-based ones may help further reduce the diffusion of $Br_2$ species. The dual-electrolyte design was used to prove the concept of the present invention as shown in FIG. 1. It is envisioned within the present invention that a modified ionic liquid that does not coordinate with $Mg^{2+}$ as strongly as $PYR_{14}TFSI$ to allow for Mg-plating at significantly reduced overpotentials, such as the recently reported PEGylated system, may allow for a single-electrolyte design. Taken as a whole, the key contribution made by the present invention lies in the demonstration of using conversion chemistries to realize the promise held by Mg as an energy storage material. It overcomes the issues connected to poor diffusion by intercalation chemistry, low voltages by sulfur chemistry and difficulty in recharge by oxygen chemistry. It represents a new route toward low-cost, high-capacity and safe batteries.

Future investigations will look at: 1) modifying the ionic liquid catholyte molecules for lower viscosity to improve rate performance, 2) finding a better ionic liquid choice that can have lower overpotential on the Mg anode to simplify the electrolyte composition, 3) to explore a better membrane to reduce the crossover effect of Bromine species to improve the efficiency, and 4) to design a better cell configuration to optimize the diffusion of reactive species.

What is claimed is:

1. An electrochemical cell comprising:
   a. an anode comprising Mg;
   b. a cathode comprising a carbonaceous material as current collector;
   c. an anolyte in contact with the anode, said anolyte comprises a non-aqueous composition; and
   d. a catholyte in contact with the cathode, said catholyte comprises one or more of $Br_2$, $Br_3^-$, and $Br_5^-$, and a non-aqueous composition, wherein the catholyte further comprises a composition selected from the group consisting of $Mg(TFSI)_2$ (Magnesium bis(trifluoromethanesulfonyl)imide)) in $PYR_{14}TFSI$ (1-butyl-1-methylpyrrolidinium bis(trifluoromethanesulfonyl)imide), propylene carbonate, dimethyl sulfoxide, dimethoxyethane, 1-Butyl-3-methylimidazolium tribromide, and acetonitrile,
   wherein the anolyte and catholyte are contained in two separate chambers, said chambers are connected via a porous barrier.

2. The electrochemical cell of claim 1, wherein the porous barrier is a porous glass frit or membrane.

3. The electrochemical cell of claim 1, wherein the carbonaceous material comprises graphite, carbon fiber, carbon paper, glassy carbon, or amorphous carbon.

4. The electrochemical cell of claim 1, wherein the carbonaceous material is configured as a sheet, a film, a foil, a tube, or a rod.

5. A rechargeable magnesium battery comprising one or more of the electrochemical cell of claim 1.

6. An electrochemical cell comprising:
   a. an anode comprising Mg;
   b. a cathode comprising a carbonaceous material as current collector; and
   c. a non-aqueous composition in contact with both said anode and cathode, said non-aqueous composition comprises one or more of $Br_2$, $Br_3^-$, and $Br_5^-$, wherein said non-aqueous composition further comprises a composition selected from the group consisting of $MgCl_2$ or $MgBr_2$ dissolved in 1-(2-(2-(2-Methoxyethoxy)ethoxy)-ethyl)-1-methylpyrrolidinium Bis(trifluoromethylsulfonyl) imide (MPEG3PyrTFSI), and methoxypolyethylene glycol (MW 350) Bis(trifluoromethylsulfonyl)imide (MPEG7PyrTFSI).

7. The electrochemical cell of claim 6, wherein the cell further comprises a polymeric $Mg^{2+}$ conductor.

8. The electrochemical cell of claim 6, wherein the cell further comprises a solid state $Mg^{2+}$ conductor.

9. A rechargeable magnesium battery comprising one or more of the electrochemical cell of claim 6.

* * * * *